US008321675B2

(12) United States Patent
Rogaway

(10) Patent No.: US 8,321,675 B2
(45) Date of Patent: Nov. 27, 2012

(54) METHOD AND APPARATUS FOR FACILITATING EFFICIENT AUTHENTICATED ENCRYPTION

(76) Inventor: Phillip W. Rogaway, Davis, CA (US)

(*) Notice: Subject to any disclaimer, the term of this patent is extended or adjusted under 35 U.S.C. 154(b) by 0 days.

(21) Appl. No.: 13/084,978

(22) Filed: Apr. 12, 2011

(65) Prior Publication Data

US 2011/0191588 A1 Aug. 4, 2011

Related U.S. Application Data

(60) Division of application No. 11/728,286, filed on Mar. 23, 2007, now Pat. No. 7,949,129, which is a continuation of application No. 11/183,674, filed on Jul. 18, 2005, now Pat. No. 7,200,227, which is a continuation-in-part of application No. 09/918,615, filed on Jul. 30, 2001, now Pat. No. 7,046,802.

(51) Int. Cl.
*H04L 29/06* (2006.01)
(52) U.S. Cl. ............... 713/170; 380/28; 380/37
(58) Field of Classification Search ............... 713/170; 380/28, 37
See application file for complete search history.

(56) References Cited

U.S. PATENT DOCUMENTS

| | | | |
|---|---|---|---|
| 4,229,818 A * | 10/1980 | Matyas et al. | 380/37 |
| 5,673,318 A | 9/1997 | Bellare | |
| 6,049,608 A * | 4/2000 | Ablowitz et al. | 380/28 |
| 6,226,742 B1 | 5/2001 | Jakubowski | |
| 6,396,928 B1 | 5/2002 | Zheng | |
| 6,704,871 B1 * | 3/2004 | Kaplan et al. | 713/192 |
| 6,963,976 B1 | 11/2005 | Jutla | |
| 6,973,187 B2 | 12/2005 | Gligor | |

(Continued)

FOREIGN PATENT DOCUMENTS

EP 1063811 A1 12/2000

OTHER PUBLICATIONS

Black, J. et al., "UMAC: Fast and Secure Message Authentication", 1999.

(Continued)

*Primary Examiner* — Michael Pyzocha
(74) *Attorney, Agent, or Firm* — Park, Vaughan, Fleming & Dowler LLP; Laxman Sahasrabuddhe

(57) ABSTRACT

A shared-key encryption scheme that uses identically keyed block-cipher calls, low additional overhead, supports the encryption of arbitrary-length strings, produces a minimal-length-ciphertext, and is fully parallelizable. In one embodiment, "OCB", a key shared between communicating parties is mapped to a key variant using the block cipher. The key variant is mapped into a sequence of basis offsets using shifts and conditional xors. To encrypt a message using a nonce, a nonce-dependent base offset is formed, and then a sequence of offsets is constructed by starting with the base offset and then xoring, for each offset, an appropriate basis offset. The message is partitioned into message blocks of the same length as the block length of the block cipher, along with a message fragment that may be shorter. Each message block is combined with a corresponding offset, enciphered, and then combined again with the offset, yielding a ciphertext block. The message fragment is xored with an appropriately computed pad to give a ciphertext fragment. A checksum is formed using the message blocks, the message fragment, and the pad. The checksum is combined with an offset and enciphered to yield a tag. The encrypted message includes the ciphertext blocks, the ciphertext fragment, and the tag.

14 Claims, 12 Drawing Sheets

U.S. PATENT DOCUMENTS

| | | | |
|---|---|---|---|
| 6,996,712 | B1 | 2/2006 | Perlman |
| 7,054,445 | B2 | 5/2006 | Gligor |
| 7,055,027 | B1 | 5/2006 | Gunter |
| 7,450,717 | B1 * | 11/2008 | Sprunk et al. ............ 380/37 |
| 2001/0033656 | A1 | 10/2001 | Gligor |
| 2001/0044904 | A1 | 11/2001 | Berg |
| 2001/0046292 | A1 | 11/2001 | Gligor |
| 2002/0048364 | A1 | 4/2002 | Gligor |
| 2004/0131182 | A1 | 7/2004 | Rogaway |
| 2005/0175175 | A1 | 8/2005 | Leech |

OTHER PUBLICATIONS

Jutla, Charanjit S. "Encryption Modes with Almost Free Message Integrity", Aug. 2000.

Menezes, Alfred J., et al., "Handbook of Applied Cryptography", 1997, CRC Press, pp. 321-383.

Jueneman, R. et al., "Message Authentication with Manipulation Detection Codes", Computer Science Corp. and IBM Corp. 1988.

Gligor, Virgil D. et al., "Fast Encryption and Authentication: XCBC Encryption and XECB Authentication Modes", Oct. 27, 2000.

Rogaway, Phillip "Efficient Instantiations of Tweakable Blockciphers and Refinements to Mode OCB and PMAC", Aug. 11, 2003, pp. 1-22.

Halevi, S. et al., "A Parallelizable Enciphering Mode", Department of Computer Science, University of CA, Davis, Jul. 28, 2003, pp. 1-24.

Bellare, Mihir et al., "Authenticated Encryption: Relations among notions and analysis of the genetic composition paradigm", Sep. 25, 2000.

Press, William H. "Numerical Recipes in C: The Art of Scientific Computing", 1992, Cambridge University Press.

* cited by examiner

METHOD AND APPARATUS FOR FACILITATING EFFICIENT AUTHENTICATED ENCRYPTION

RELATED APPLICATION

This application is a divisional of, and claims priority under 35 U.S.C. §120 to, U.S. patent application Ser. No. 11/728,286, entitled, "Method and Apparatus for Facilitating Efficient Authenticated Encryption," by inventor Phillip W. Rogaway, filed 23 Mar. 2007. U.S. patent application Ser. No. 11/728,286 is a continuation of, and claims priority under 35 U.S.C. §120 to, U.S. patent application Ser. No. 11/183,674 (U.S. Pat. No. 7,200,227). U.S. patent application Ser. No. 11/183,674 is a continuation-in-part of, and claims priority under 35 U.S.C. §120 to, U.S. patent application Ser. No. 09/918,615 (U.S. Pat. No. 7,046,802).

BACKGROUND

1. Field of the Invention

The present invention relates generally to cryptographic techniques for the construction of symmetric (shared-key) encryption schemes, and more particularly, to ways to use a block cipher in order to construct a highly efficient encryption scheme that simultaneously provides both message privacy and message authenticity.

2. Related Art

When two parties, a Sender and a Receiver, communicate, the parties often need to protect both the privacy and the authenticity of the transmitted data. Protecting the privacy of the data ensures that unauthorized parties will not understand the content of transmissions. Protecting the authenticity of the data provides assurance to the Receiver that the actual Sender of a message coincides with the claimed Sender of the message (and it thereby provides assurance to the Receiver that the message was not accidentally or intentionally modified in transit). Both goals are often accomplished using symmetric ("shared key") techniques, wherein the Sender and the Receiver make use of a shared key K. We call "authenticated encryption" the goal of simultaneously achieving both privacy and authenticity using shared-key techniques. In an authenticated-encryption method, the Sender can encrypt a message using a key and a nonce (also called an Initialization Vector, or IV) to yield a ciphertext. The Receiver can decrypt a ciphertext using a key and a nonce to yield either a message or a special symbol, invalid, that indicates to the Receiver that the ciphertext should be regarded as inauthentic.

The most common approach for authenticated encryption uses two different tools: for privacy, a privacy-only encryption scheme, and for authenticity, a message authentication code (MAC). Privacy-only encryption schemes compute a ciphertext from a plaintext, a key, and a nonce. Message authentication codes compute an authentication tag (which is a fixed-length string) from a message and a key. To MAC a message means to computes its authentication tag using a message authentication code.

Many constructions for privacy-only encryption schemes and many constructions for message authentication codes are known in the art. Some are described, for example, in the book of Menezes, van Oorschot and Vanstone, *Handbook of Applied Cryptography*, published by CRC Press, 1997. Both privacy-only encryption schemes and message authentication codes are commonly based on the use of a block cipher.

By way of further background, a block cipher is a function E that takes a key K and a message block X, the key being a binary string from some set of allowed keys and the message block being a binary string of some fixed length n. The block cipher returns a ciphertext block $Y=E_K(X)$, which is also a binary string of length n. The number n is called the block length of the block cipher. It is required that for each key K, the function $E_K$ is one-to-one and onto (in other words, it is a bijection on the space of n-bit strings). Since $E_K$ is one-to-one and onto, it has a well-defined inverse, denoted $E_K^{-1}$. Well known block ciphers include the algorithm of the Data Encryption Standard (DES), which has a block length of n=64 bits, and the algorithm of the Advanced Encryption Standard (AES), which has a block length of n=128 bits. We shall speak of "applying a block cipher" or "enciphering" to refer to the process of taking an n-bit string X and computing from it a string $Y=E_K(X)$ for some understood key K and block cipher E. Similarly, we shall speak of "deciphering" to refer to the process of taking an n-bit string Y and computing from it a string $X=E_K^{-1}(Y)$.

The most common approach for privacy-only encryption using an n-bit block cipher E is CBC encryption (cipher block chaining encryption). In the "basic" form of CBC encryption, the message M that we wish to encrypt must be a binary string of length that is a positive multiple of the block length n. The message M is partitioned into n-bit blocks M[1], M[2], ..., M[m] by taking M[1] as the first n bits of M, taking M[2] as the next n bits of M, and so forth. An n-bit nonce, IV, is selected. Then one encrypts M using the key K and the nonce IV by computing, for each i∈[1 ... m], the ciphertext block $$C[i]=E_K(C[i-1] \oplus M[i])$$

where C[0]=IV. The complete ciphertext is IV together with the ciphertext C=C[1] ... C[m].

Nonces are used quite generally for shared-key encryption. A nonce is a value used at most once (or almost certainly used at most once) within a given context. Most often, nonces are realized using a counter or random value. For CBC encryption, a random value should be used; for CBC encryption, there are problems with using a counter IV.

The most common approach for making a message authentication code using an n-bit block cipher E is the CBC MAC (cipher block chaining message authentication code). In the "basic" form of the CBC MAC, the message M to be authenticated must be a binary string having a length that is a positive multiple of n. The message M is partitioned into n-bit blocks M[1], M[2], ..., M[m] by taking M[1] as the first n bits of M, taking M[2] as the next n bits of M, and so forth. One then computes the authentication tag of M, using key K, by way of the same algorithm used for CBC encryption, but where the IV=0, the block of n zero bits, and where the authentication tag is the final ciphertext block, Tag=C[m]. Only Tag, or a prefix of Tag, is output as the authentication tag. A Receiver who obtains an authenticated message M∥Tag checks the validity of M by re-computing the CBC MAC of M under key K, obtaining a string Tag', and verifying that Tag' is identical to Tag.

To combine CBC encryption and the CBC MAC, in order to obtain both privacy and authenticity, use the generic composition method. One uses two keys: an encryption key Ke and a message-authentication key Ka. In one method for generic composition, the message M is CBC encrypted using key Ka and nonce IV to yield an intermediate ciphertext $C_{int}$=IV∥C[1] ... C[m]. Then the intermediate ciphertext $C_{int}$ is MACed using the CBC MAC under key Ka to yield an authentication tag Tag. The ciphertext for the authenticated-encryption scheme is C=C[1] ... C[m]∥Tag. The Receiver, on receipt of IV and C[1] ... C[m]∥Tag, checks that Tag is the CBC MAC of $C_{int}$=IV∥C[1] ... C[m] under key Ka. If the received Tag is what the Receiver computes it should be, the Receiver decrypts C[1] ... C[m] using key Ke and nonce IV to obtain the plaintext M. If the received Tag is different from what the Receiver computes it should be, the Receiver rejects the received ciphertext C=C[1] ... C[m]||Tag, regarding it as invalid.

The same generic-composition approach can be used to combine any privacy-only encryption scheme with any message authentication code.

There are a number of limitations to the generic composition approach. The main limitation is that two sequential computing passes are made over the data, one to privacy-only encrypt and one to MAC, making the process twice as slow as privacy-only encryption (assuming that privacy-only encryption and MAC computation take about the same amount of time, as they would for CBC encryption and the CBC MAC). Privacy-only encryption can be computationally expensive, and adding in a major additional expense to ensure message authenticity is considered undesirable in many settings.

Because of the limitation just described, individuals have tried for many years to merge privacy and authenticity into a single, unified process that would be nearly as fast as conventional ways to do privacy-only encryption. Until quite recently, all such attempts failed. For a history of some of the failed attempts, see the survey article of Bart Preneel entitled *Cryptographic Primitives for Information Authentication—State of the Art*, appearing in *State of the Art of Applied Cryptography, COSIAC '97*, Lecture Notes in Computer Science, vol. 1528, Springer-Verlag, pp. 49-104, 1998. As an example of a particularly recent attempt, Gligor and Donescu describe an incorrect authenticated-encryption mode in their paper *Integrity Aware PCBC Encryption*, appearing in *Security Protocols, 7th International Workshop*, Cambridge, UK, Apr. 19-21, 1999, Lecture Notes in Computer Science, vol. 1796, Springer-Verlag, pp. 153-171, 2000.

The first publicly disclosed authenticated-encryption scheme that achieves nearly the speed of a conventional, privacy-only encryption scheme, was developed by Charanjit Jutla, of IBM. Jutla describes two authenticated-encryption methods in his paper *Encryption Modes with Almost Free Message Integrity*, which first appeared in the Cryptology ePrint Archive on Aug. 1, 2000. (Later versions of this paper subsequently appeared in *Advances in Cryptology—Eurocrypt* 2001, Lecture Notes in Computer Science, vol. 2045, Springer-Verlag, May 2001, and as a submission to NIST (the National Institute of Standards and Technology), posted on NIST's website on Apr. 17, 2001.) One of Jutla's schemes is similar to CBC encryption and is called IACBC. The other one of Jutla's scheme is parallelizable mode that Jutla calls IAPM. Jutla's IACBC scheme is illustrated in FIG. 6, while his IAPM scheme is illustrated in FIG. 7.

Both IACBC and IAPM are authenticated-encryption schemes based on an n-bit block cipher, E. The modes require that the message M which is to be encrypted has a length which is a positive multiple of the block length n: say M=M[1] ... M[m], where each M[i] is n bits long. The schemes employ two block-cipher keys, K1 and K2, which together comprise the encryption key K=(K1, K2). Conceptually, there are two processes involved: a "make-offset process" and a "main process". The make-offset process is the same for IACBC and IAPM, while the main process in the two schemes differ.

Referring to the left hand side of FIGS. 6 and 7, the make-offset process in IACBC and IAPM uses the key K2 to map a random nonce, R, into a sequence of "pairwise independent" offsets, Z=Z[0], ..., Z[m], Z[m+1]. Notice that one needs two more offsets than the message M is long (measured in blocks). Each offset is n bits. Jutla describes two different methods to realize the make-offset process. We shall describe these methods shortly; for now we view the production of offsets as a black-box process and we continue the explanation of the main-process of IACBC and IAPM.

The main process of IACBC is shown in the right-hand side of FIG. 6. Having used the key K2 and the nonce R to derive offsets Z[0], ..., Z[m+1], encipher nonce R, now under key K1, to determine an initial chaining value, Y[0]=C[0]=$E_{K1}$(R). Then CBC encrypt M=M[1] ... M[m]: for i∈[1 ... m], let Y[i]=$E_{K1}$(Y[i−1]⊕M[i]). Next, mask each of these block-cipher outputs to determine a ciphertext block: for i∈[1 ... m], let C[i]=Y[i]⊕Z[i]. Call the string C=C[1] ... C[m] is the "ciphertext core". Next one computes a "checksum", Checksum, by xoring the message blocks: Checksum=M[1]⊕ ... ⊕M[m]. Next one forms an "authentication tag" by setting Tag=$E_{K1}$(Checksum⊕Y[m])⊕Z[0]. The complete ciphertext specifies C[0], ciphertext core C=C[1] ... C[m], and authentication tag Tag.

Decryption proceeds by the natural algorithm, as will be understood by those skilled in the art to which the present invention pertains, rejecting the ciphertext if the supplied authentication tag does not have the anticipated value.

We now describe the main process of IAPM, as show in the right-hand side of FIG. 7. Having used the key K2 and the nonce R to derive offsets Z[0], ..., Z[m+1], encipher R, now using key K1, to determine an enciphered R-value, C[0]=$E_{K1}$(R). Now, for each i∈[1 ... m], message block M[i] is xored with offset Z[i], the result is enciphered using E (keyed by K1), and the resulting block is xored once again with offset Z[i], yielding a ciphertext block C[i]: that is, for each i∈[1 ... m], let C[i]=Z[i]⊕$E_{K1}$(M[i]⊕Z[i]). Call C=C[1] ... C[m] the ciphertext core. Next, compute a checksum, Checksum, by xoring together the message blocks: Checksum= M[1]⊕ ... ⊕M[m]. Next, form an authentication tag, Tag, by xoring the checksum with offset Z[m+1], enciphering the result with $E_{K1}$, and xoring the resulting block with offset Z[0]: Tag=Z[0]⊕$E_{K1}$(Checksum⊕Z[m+1]). The complete ciphertext specifies C[0], ciphertext core C=C[1] ... C[m], and authentication tag Tag.

Decryption proceeds by the natural algorithm, rejecting a ciphertext if its supplied authentication tag does not have the anticipated value. Namely, set R=$E_{K1}^{-1}$(C[0]) and use R and K2 to compute the offset sequence Z[0], ..., Z[m+1]. Then compute the prospective plaintext M'=M[1] ... M[m] by setting M[i]=Z[i]⊕$E_{K1}^{-1}$(C[i]⊕Z[i]). Next, re-compute the tag Tag' that one would expect for the prospective plaintext M': Checksum=M[1]⊕ ... ⊕M[m] and Tag'=Z[0]⊕$E_{K1}$(Checksum⊕Z[m+1]). If the expected tag, Tag', matches the tag Tag appearing within the ciphertext, then the plaintext M is defined as the prospective plaintext M'. Otherwise, the received ciphertext is invalid.

It should be noted that IACBC is not parallelizable: one can not compute Y[i] until Y[i−1] has already been computed, making that method inherently sequential. But IAPM is fully parallelizable: all of the block-cipher calls needed to compute the ciphertext core can be computed at the same time.

We comment that the nonce R used in IACBC must be random. Use of a counter, or another adversarially predictable value, will result in an incorrect scheme.

It is important to optimize the speed of the make-offset process because, if it is slow, then the entire encryption process will be slow. Jutla's "method 1" for making offsets is depicted in FIG. 8. It works as follows. Let t be the number of bits needed to write m+2 in binary; that is, $$t=1+\lfloor \log_2(m+2) \rfloor.$$

Now for each $i \in [1 \ldots t]$, let $$IV[i] = E_{K2}(R+i)$$

where the indicated addition operation means computer addition of n-bit strings (that is, regard i as an n-bit string and add it to the n-bit string R, ignoring any carry that might be generated). The value R should be a random value (a counter, for example, will not work correctly). Offsets are now formed by xoring together different combinations of IV[i]-values. Jutla suggests the following to compute each Z[i] value, for $i \in [0 \ldots m+1]$. Number bit positions left-to-right by $1, \ldots, t$ and let $i_1, \ldots, i_s \in [1 \ldots t]$ denote all of the bit positions where i+1, when written as a t-bit binary number, has a 1-bit. Then set $$Z[i] = IV[i_1] \oplus \ldots \oplus IV[i_s]$$

As an example, if m=3 then t=3 (since 5 is 101 in binary, which takes 3 bits to write down), Z[0]=IV[3] (since 1 is 001 in binary), Z[1]=IV[2] (since 2 is 010 in binary), Z[2]=IV[2]⊕IV[3] (since 3 is 011 in binary), Z[3]=IV[1] (since 4 is 100 in binary), and Z[4]=IV[1]⊕IV[3] (since 5 is 101 in binary).

We now describe Jutla's "method 2" for making offsets. Choose a large prime number p just less than $2^n$ (e.g., choose the largest prime less than $2^n$) and then, for $i \in [0 \ldots m+1]$, set $$Z[i] = (IV[1] + i \cdot IV[2]) \bmod p$$

where $IV[1] = E_{K2}(R+1)$ and $IV[2] = E_{K2}(R+2)$ are defined as before. Again, nonce R should be a random value. The multiplication operator "·" refers to ordinary multiplication in the integers. Notice that for $i \geq 1$, the value of Z[i] can be computed from Z[i−1] by addition of IV[2], modulo p. This second method of Jutla's requires fewer block-cipher calls than the first method of Jutla's (block-cipher calls are used to make the IV[i] values, and now only two such values are needed, regardless of the length of the message). On the other hand, the mod p addition is likely more expensive than xor.

The property that Jutla demands of the sequence of offsets he calls pairwise independence, but Jutla does not use this term in accordance with its customary meaning in probability theory. Jutla appears to mean the property usually called strongly universal-2. A family of random variables Z[0], Z[1], Z[2], . . . , each with range D, is said to be strongly universal-2 if, for all i≠j, the random variable (Z[i], Z[j]) is uniformly distributed D×D.

Just subsequent to the appearance of Jutla's paper, two other authors, Virgil Gligor and Pompiliu Donescu, described another authenticated-encryption scheme. Their paper, dated Aug. 18, 2000 and entitled, http://www.eng.umd.edu/~gligorFast Encryption and Authentication: XCBC encryption and XECB Authentication Modes, first appeared on Gligor's worldwide web homepage. The Gligor-Donescu authenticated-encryption scheme, which the authors call XCBC, resembles Jutla's IACBC. The scheme called XCBC$ is depicted in FIG. 9. The main difference between IACBC and XCBC$ is that the latter uses offsets Z[1], Z[2], . . . Z[m+1], which are now defined by: Z[0]=0 and, for $i \in [1 \ldots m+1]$, Z[i+1]=Z[i−1]+R. The indicated addition means addition of binary strings, modulo $2^n$. Besides this "method 3" to create offsets, one should note that the value of Z[i] is now added (modulo $2^n$) to the block-cipher output, rather than being xored with the block-cipher output. Other differences between the Jutla and Gligor-Donescu schemes will be apparent to those skilled in the relevant art when comparing FIGS. 5 and 8.

As with Jutla's schemes, the nonce R in XCBC$ should be a random value; use of a counter, or another adversarially-predictable quantity, will not work correctly. The authors give a closely related scheme, XCBC, which employs a counter instead of a random value. That scheme is illustrated in FIG. 10. The complete ciphertext specifies the nonce, "ctr", as well as C[1] . . . C[m]∥Tag.

It should be noted that XCBC and XCBC$, like IACBC, are sequential. Gligor's paper, as it originally appeared, did not suggest a parallelizable approach for authenticated encryption.

All of the available authenticated-encryption schemes we have described thus far share the following limitation: they assume that all messages to be encrypted have a length that is a positive multiple of the block length n. This restriction can be removed by first padding the message, using padding techniques well-known in the art. For example, one can append to every message M a "1" bit and then append the minimum number of 0-bits so that the padded message has a length which is a multiple of n. We call this "obligatory padding". Decryption removes the obligatory padding to recover the original message. However, removing the length restriction in an authenticated-encryption scheme by obligatory padding is undesirable because it increases the length of the ciphertext (by an amount between 1 and n−1 bits). Furthermore, the method results in an extra block-cipher invocation when the message M is of a length already a positive multiple of n.

Another approach known in the art to deal with messages whose length is not a positive multiple of n is "ciphertext stealing CBC encryption", which is like ordinary CBC encryption except that the final message block M[m] may have fewer than n bits and the final ciphertext block C[m] is defined not by $C[m] = E_K(M[m] \oplus C[m-1])$ but by $C[m] = E_K(C[m-1]) \oplus M[m]$. One could hope to somehow use ciphertext stealing in an authenticated-encryption scheme, but it is not known how to do this in a way that does not destroy the authenticity property required of an authenticated-encryption scheme. In particular, natural attempts to try to modify IAPM in a manner that employs ciphertext stealing result in flawed schemes. A possible approach is to adapt ideas from the paper of Black and Rogaway, *CBC MACs for Arbitrary-Length Messages: The Three Key Constructions*, appearing in *Advances in Cryptology—CRYPTO '00*, Lecture Notes in Computer Science, Springer-Verlag, 2000. This paper teaches the use of obligatory padding for messages of length zero or a non-multiple of n, combined with no padding for messages of length of positive multiple of n, combined with xoring into the last block one of two different keys, as a way to differentiate these two different cases. However, such a method is tailored to the construction of message authentication codes, particularly message authentication codes based on the CBC MAC. It is unknown if such methods can be correctly adapted to an authenticated-encryption scheme like IAPM.

An additional limitation of the authenticated-encryption techniques we have discussed is the use of multiple keys. While well-known key-separation techniques can create as many "key variants" as one needs from a single underlying key, depending on such methods results in additional time for key-setup and additional space for key storage. It is unknown how one could devise a correct algorithm that would use only a single block-cipher key and use this one key to key all block-cipher invocations.

Method 1 for computing offsets is complex and slow, needing an unbounded number of block-cipher calls. The values IV[1], . . . , IV[t] can be computed during a pre-processing stage, but this pre-processing will be slow. Method 2 for computing offsets requires modulo p addition, which is not particularly fast because typical implementations use blocks having n=128 bits. Method 3 for computing offsets likewise requires addition (now modulo $2^n$) of quantities typically having n=128 bits, which may again be inconvenient because computers do not generally support such an operation, and high-level programming languages do not give access to the add-with-carry instruction that best helps to implement it. Most of the methods we have described require the use of a random nonce R, and the schemes will not work correctly should R be predictable by an adversary.

SUMMARY

Variations of the present invention provide methods for constructing more efficient authenticated-encryption schemes. The new methods give rise to parallelizable authenticated-encryption schemes that combine any or all of the following features: (1) Messages of arbitrary bit length (not necessarily a multiple of the block length n) can be encrypted. (2) The resulting ciphertext will be as short as possible (in particular, the ciphertext core will have the same length as the message that is being encrypted, even when the message length is not a multiple of the block length). (3) Offsets can be computed by extremely fast and simple means, and without the use of modular addition. (4) Pre-processing costs are very low (e.g., one block-cipher call and some shifts and xors). (5) The encryption key is a single block-cipher key, and all block-cipher calls make use of only this one key. (6) The needed nonce may be adversarially predictable (a counter is fine). (7) Only as many offsets are needed as the message is long (in blocks). (8) A total of m+2, (or even m+1) block-cipher calls are adequate to encrypt a message of m blocks.

To achieve these and other goals, new techniques have been developed. A first set of techniques concern the "structure" of an authenticated-encryption scheme, and describe improved methods for how the message M is partitioned into pieces and how these pieces are then processed. A second set of techniques concern improved ways to generate the needed offsets. A third set of techniques deal with methods to avoid the use of multiple block-cipher keys. A fourth set of techniques facilitate authenticated-encryption schemes which efficiently process associated-data, where associated-data refers to information which should be authenticated by the Receiver but which is not a part of the message that is being encrypted. The different types of improvements are largely orthogonal.

More specifically, one embodiment of the present invention provides an authenticated-encryption method that uses a key, a nonce, and an n-bit block cipher to encrypt a message of arbitrary bit length into a ciphertext core and a tag, the ciphertext core having the same length as the message. The system operates by first partitioning the message into a message body having a multiple of n bits and a message fragment having at most n bits. Next, the system generates a sequence of offsets from the nonce and the key, and computes a ciphertext body having the same length as the message body using the n-bit block cipher, the message body, the key, and the sequence of offsets. The system then computes an n-bit pad from the length of the message fragment, an offset from the sequence of offsets, the n-bit block cipher, and the key, and computes a ciphertext fragment having the same length as the message fragment from the message fragment and the n-bit pad. The system then defines the ciphertext core as the ciphertext body concatenated with the ciphertext fragment, and defines the tag as a function of the message body, the ciphertext fragment, the n-bit pad, the offset from the sequence of offsets, and the key.

In a variation of this embodiment, the sequence of offsets is produced by computing an initial offset from the nonce, the key, and the n-bit block cipher, and each subsequent offset is produced from the prior offset by a process involving at least one shift and one conditional xor operation.

A further embodiment of the present invention provides an authenticated-encryption method that uses a single block cipher key, a nonce, and an n-bit block cipher keyed by the single block cipher key to encrypt a message into a ciphertext. The system operates by utilizing a sequence of offsets, comprising the steps of: computing an initial offset using the nonce and the n-bit block cipher, computing each subsequent offset by applying at least one shift and at least one conditional xor operation to the prior offset, and computing the ciphertext by combining the sequence of offsets and the message, using the n-bit block cipher.

A further embodiment of the present invention provides a parallelizable authenticated-encryption method that uses a key, a nonce, and an n-bit block cipher to encrypt a message of arbitrary bit length into a ciphertext core and a tag, the ciphertext core having the same length as the message and all invocations of the n-bit block cipher keyed using the key. The system operates by first partitioning the message into m−1 message blocks of n bits and a message fragment of at most n bits. Next, the system generates from the nonce a sequence of m+1 offsets, each of n bits, by first invoking the n-bit block cipher and then applying a sequence of shift and conditional xor operations. For each number i between 1 and m−1, the system then computes an $i^{th}$ ciphertext block by xoring an $i^{th}$ message block with an $i^{th}$ offset, applying the n-bit block cipher, and xoring the result with the $i^{th}$ offset. The system computes a pad by xoring an n-bit encoding of the length of the message fragment with an $m^{th}$ offset and applying the n-bit block cipher, an then computes a ciphertext fragment having the same length as the message fragment by xoring the message fragment and a portion of the pad. Next, the system defines the ciphertext core as a concatenation of an m−1 ciphertext blocks and the ciphertext fragment. The system computes an n-bit padded ciphertext fragment from the ciphertext fragment, computes a checksum by xoring the m−1 message blocks, the pad, and the n-bit padded ciphertext fragment, and computes the tag by xoring the checksum and an $(m+1)^{st}$ offset and applying the n-bit block cipher.

A further embodiment of the present invention provides an authenticated-encryption method that provides for associated-data, the method depending on a pseudorandom function and the authenticated-encryption method, wherein the authenticated-encryption method does not provide for associated-data, wherein encryption of a message into a ciphertext is achieved by: encrypting the message with the authenticated-encryption method that does not provide for an associated data to determine a ciphertext core and a tag, applying the pseudorandom function to the associated-data to determine an associated-data authenticator, and defining the ciphertext to be the ciphertext core together with an xor of the tag and the associated-data authenticator.

A further embodiment of the present invention provides an authenticated-encryption method that provides for associated-data, the method utilizing a key, a nonce, an n-bit block cipher, and a pseudorandom function to encrypt a message of arbitrary bit length into a ciphertext core and a tag, the ciphertext core having the same length as the message. The system operates by partitioning the message into a message body having a multiple of n bits and a message fragment having at most n bits and generating a sequence of offsets from the nonce and the key. The system then computes a ciphertext body having the same length as the message body using the n-bit block cipher, the message body, the key, and the sequence of offsets, computes an n-bit pad from the length of the message fragment, an offset from the sequence of offsets, the n-bit block cipher, and the key, and computes a ciphertext fragment having the same length as the message fragment from the message fragment and the n-bit pad. Next, the system defines the ciphertext core as the ciphertext body concatenated with the ciphertext fragment. The system then computes a checksum from the message body, the ciphertext fragment, and the n-bit pad, computes a full tag using the checksum, the offset from the sequence of offsets, the n-bit block cipher, and the key, and computes an associated-data authenticator by applying the pseudorandom function, keyed by the key, to the associated-data. Finally, the system defines the tag as an xor of the full tag and the associated-data authenticator.

In a variation of this embodiment, the sequence of offsets is produced by computing an initial offset from the nonce, the key, and the n-bit block cipher, and each subsequent offset is produced from a prior offset by a process involving at least one shift and at least one conditional xor operation.

A further embodiment of the present invention provides an authenticated-encryption method that uses a key, a nonce, and an n-bit tweakable block cipher to encrypt a message of arbitrary bit length into a ciphertext core of the same length and a tag, all invocations of the n-bit tweakable block cipher keyed by the key. The system operates by first partitioning the message into m−1 message blocks of n bits and a message fragment of at most n bits. For each number i between 1 and m−1, the system computes an $i^{th}$ ciphertext block by applying the n-bit tweakable block cipher to an $i^{th}$ message block, using a first tweak consisting of the nonce, the number i, and a constant 0. The system then computes a pad by applying the n-bit tweakable block cipher to a string that encodes a length of the message fragment, using a second tweak consisting of the nonce, a number m, and a constant 1, and computes a ciphertext fragment by xoring the message fragment and a portion of the pad that has a same number of bits as the message fragment. Next, the system defines the ciphertext core as a concatenation of the m−1 ciphertext blocks and the ciphertext fragment. The system then computes an n-bit padded ciphertext fragment from the ciphertext fragment, computes a checksum by xoring the m−1 message blocks, the pad, and the n-bit padded ciphertext fragment, and computes the tag by applying the n-bit tweakable block cipher to the checksum, using a tweak consisting of the nonce, the number m, and a constant 2.

In a variation of this embodiment, the n-bit tweakable block cipher is implemented using an n-bit conventional block cipher, each invocation of the n-bit tweakable block cipher utilizing at least one shift operation, at least one conditional xor operation, and at least one call to the n-bit conventional block cipher.

A further embodiment of the present invention provides a parallelizable authenticated-encryption method that provides for associated-data and uses a key, a nonce, and an n-bit tweakable block cipher to encrypt a message of arbitrary bit length into a ciphertext core of the same length and a tag, all invocations of the n-bit tweakable block cipher keyed by the key. The system operates by first partitioning the message into m−1 message blocks of n bits and a message fragment of at most n bits. For each number i between 1 and m−1, the system then computes an $i^{th}$ ciphertext block by applying the n-bit tweakable block cipher to an $i^{th}$ message block, using a first tweak consisting of the nonce, the number i, and a constant 0. Next, the system computes a pad by applying the n-bit tweakable block cipher to a string that encodes a length of the message fragment, using a second tweak consisting of the nonce, the number m, and a constant 1, and computes a ciphertext fragment by xoring the message fragment and a portion of the pad that has a same number of bits as the message fragment. The system then defines the ciphertext core as a concatenation of the m ciphertext blocks and the ciphertext fragment. Next, the system computes an n-bit padded ciphertext fragment from the ciphertext fragment, computes a checksum by xoring the m−1 message blocks, the pad, and the n-bit padded ciphertext fragment, computes a full tag by applying the n-bit tweakable block cipher to the checksum, using a third tweak consisting of the nonce, the number m, and a constant 2, and computes an associated-data authenticator by applying a pseudorandom function to the associated-data. Finally, the system defines the tag as a portion of the string that is an xor of the full tag and the associated-data authenticator.

In a variation of this embodiment, the n-bit tweakable block cipher is implemented using an n-bit conventional block cipher, each invocation of the n-bit tweakable block cipher utilizing at least one shift operation, at least one conditional xor operation, and at least one call to the n-bit conventional block cipher.

DETAILED DESCRIPTION

Figure 1:
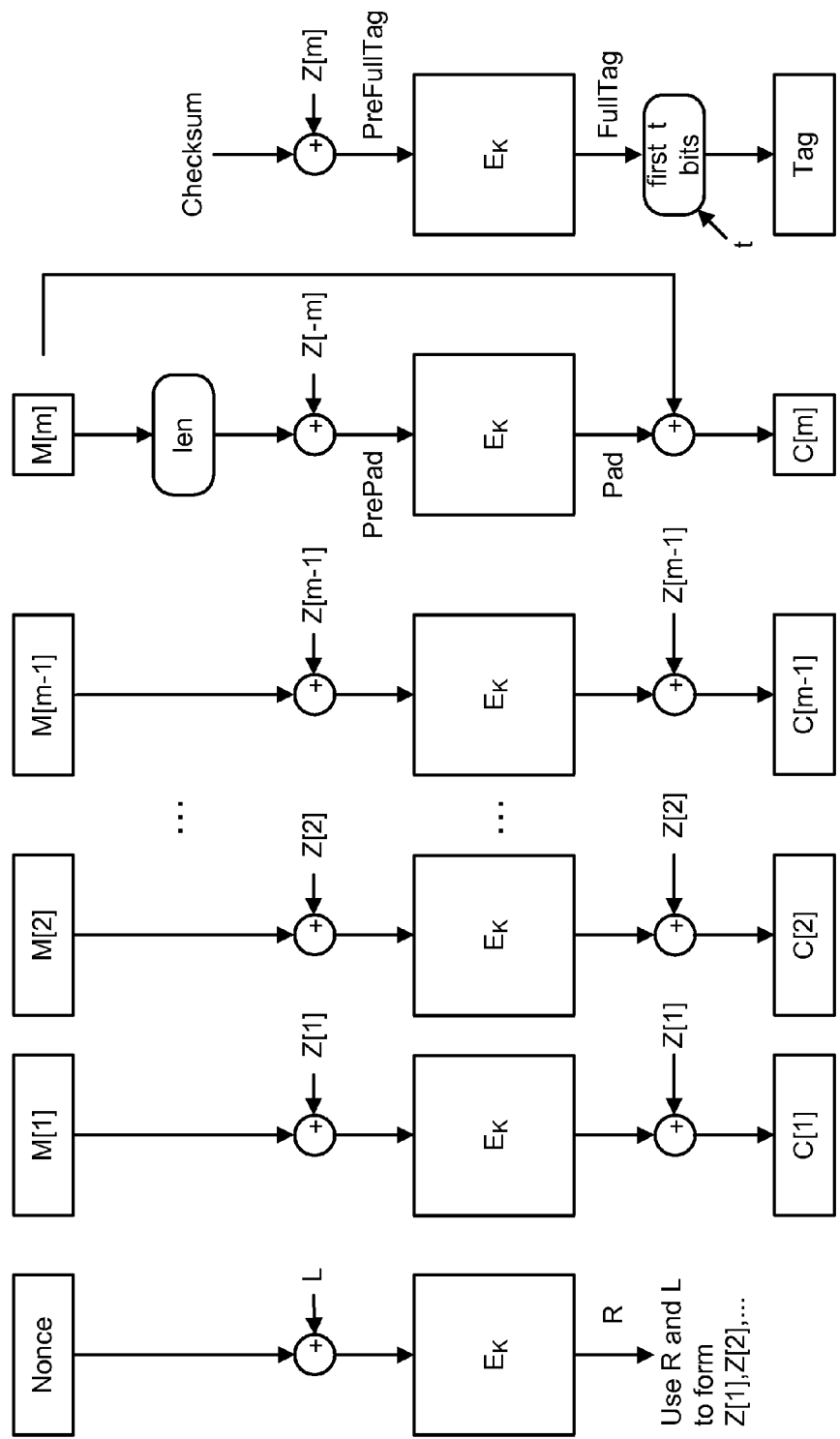
FIG. 1 describes encryption under "OCB", where OCB is the name for one embodiment of many of the techniques taught in the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

We now describe an embodiment of the present invention known as OCB (for offset codebook) mode. OCB is an authenticated-encryption scheme that uses an n-bit block cipher E, a key K, and a nonce Nonce to encrypt an arbitrary message M. To specify OCB we begin by giving some notation and reviewing some mathematical background.

Notation and Mathematical Background

If a and b are integers, $a \leq b$, then [a . . . b] is the set of all integers between and including a and b. If $i \geq 1$ is an integer then ntz(i) is the number of trailing 0-bits in the binary representation of i (equivalently, ntz(i) is the largest integer z such that $2^z$ divides i). So, for example, ntz(7)=0 and ntz(8)=3.

A string is a finite sequence of symbols, each symbol being 0 or 1. The string of length 0 is called the empty string and is denoted $\epsilon$. Let $\{0,1\}^*$ denote the set of all strings. If A, B$\in\{0,1\}^*$ then A B, or A||B, is their concatenation. If A$\in\{0,1\}^*$ and A$\neq\epsilon$ then firstbit(A) is the first bit of A and lastbit(A) is the last bit of A. Let i and n be nonnegative integers. Then $0^i$ and $1^i$ denote strings of i 0's and 1's, respectively. For n understood, 0 means $0^n$. Let $\{0,1\}^n$ denote the set of all strings of length n. If A$\in\{0,1\}^*$ then |A| is the length of A, in bits, while $|A|_n = \max(1, \lceil |A|/n \rceil)$ is the length of A in n-bit blocks, where the empty string counts as one block. For A$\in\{0,1\}^*$ and $|A| \leq n$, zpad$_n$(A) is A||$0^{n-|A|}$. With n understood we write A0* for zpad$_n$(A). If A$\in\{0,1\}^*$ and t$\in[0 . . . A]$ then A [first t bits] and A [last t bits] are the first t bits of A and the last t bits of A, respectively. Both of these values are the empty string if t=0. If A, B$\in\{0,1\}^*$ then A$\oplus$B is the bitwise xor of A[first s bits] and B[first s bits] where s=min{|A|,|B|}; for example, 1001$\oplus$110=010.

If A=$a_{n-1} \ldots a_1 a_0 \in \{0,1\}^n$ is a string, each $a_i \in \{0,1\}$, then str2num(A) is the number $\sum_{0 \leq i \leq n-1} 2^i a_i$ that this string represents, in binary. If a$\in[0 \ldots 2^{n-1}]$ is a number, then num2str$_n$(a) is the n-bit string A such that str2num(A)=a. Let len$_n$(A)= num2str$_n$(|A|) be the string that encodes the length of A as an n-bit string. We omit the subscript n when it is understood.

If A=$a_{n-1} a_{n-2} \ldots a_1 a_0 \in \{0,1\}^n$ then A<<1=$a_{n-2} \ldots a_1 a_0 0$ is the n-bit string which is a left shift of A by 1 bit (the first bit of A disappearing and a zero coming into the last bit), while A>>1=$0 a_{n-1} a_{n-2} \ldots a_1$ is the n-bit string which is a right shift of A by one bit (the last bit disappearing and a zero coming into the first bit).

In pseudocode we write "Partition M into M[1] . . . M[m]" as shorthand for "Let m=$|M|_n$ and let M[1], . . . , M[m] be strings such that M[1] . . . M[m]=M and |M[i]|=n for $1 \leq i < m$." We write "Partition C into C[1] . . . C[m] T" as shorthand for "if |C|<t then return invalid. Otherwise, let C=C[first|C|-t bits], let T=C[last t bits], let m=$|C|_m$, and let C[1] . . . C[m] be strings such that C[1] . . . C[m]=C and |C[i]|=n for $1 \leq i < m$." Recall that $|M|_n = \max\{1, \lceil |M|/n \rceil\}$, so the empty string partitions into m=1 blocks, that one block being the empty string.

By way of mathematical background, recall that a finite field is a finite set together with an addition operation and a multiplication operation, each defined to take a pair of points in the field to another point in the field. The operations must obey certain basic axioms defined by the art. (For example, there must be a point 0 in the field such that a+0=0+a=a for every a; there must be a point 1 in the field such that a·1=1·a=a for every a; and for every a$\neq$0 there must be a point $a^{-1}$ in the field such that a·$a^{-1}$=$a^{-1}$·a=1.) For each number n there is a unique finite field (up to the naming of the points) that has $2^n$ elements. It is called the Galois field of size $2^n$, and it is denoted GF($2^n$).

We interchangeably think of a point a$\in$GF($2^n$) in any of the following ways: (1) as an abstract point in a field; (2) as an n-bit string $a_{n-1} \ldots a_1 a_0 \in \{0,1\}^n$; (3) as a formal polynomial a(x)=$a_{n-1} x^{n-1} + \ldots + a_1 x + a_0$ with binary coefficients; (4) as a nonnegative integer between 0 and $2^{n-1}$, where the string a$\in\{0,1\}^n$ corresponds to the number str2num(a). For example, one can regard the string a=$0^{125}$101 as a 128-bit string, as the number 5, as the polynomial $x^2+1$, or as a particular point in the finite field GF($2^{128}$). We write a(x) instead of a if we wish to emphasize the view of a as a polynomial in the formal variable x.

To add two points in GF($2^n$), take their bitwise xor. We denote this operation by a$\oplus$b.

Before we can say how to multiply two points we must fix some irreducible polynomial poly$_n$(x) having binary coefficients and degree n. For OCB, choose the lexicographically first polynomial among the irreducible degree-n polynomials having a minimum number of coefficients. For n=128, the indicated polynomial is poly$_{128}$(x)=$x^{128}+x^7+x^2+x+1$.

To multiply points a, b $\in$GF($2^n$), which we denote a·b, regard a and b as polynomials a(x) and b(x), form their product polynomial c(x) (where one adds and multiplies coefficients in GF(2)), and take the remainder one gets when dividing c(x) by the polynomial poly$_n$(x). By convention, the multiplication operator has higher precedence than addition operator and so, for example, $\gamma_1$·L$\oplus$R means ($\gamma_1$·L)$\oplus$R.

It is particularly easy to multiply a point a$\in\{0,1\}^n$ by x. We illustrate the method for n=128, where poly$_n$(x)=$x^{128}+x^7+x^2+x+1$. Then multiplying a=$a_{n-1} \ldots a_1 a_0$ by x yields the polynomial $a_{n-1} x^n + a_{n-2} x^{n-1} + a_1 x^2 + a_0 x$. Thus, if the first bit of a is 0, then a·x=a<<1. If the first bit of a is 1 then we must add $x^{128}$ to a<<1. Since $x^{128}+x^7+x^2+x+1=0$ we know that $x^{128}=x^7+x^2+x+1$, so adding $x^{128}$ means to xor by $0^{120}$10000111. In summary, when n=128, a<<1 if firstbit(a)=0, and a·x=

(a<<1)$\oplus 0^{120}$10000111 if firstbit(a)=1

If a$\in\{0,1\}^n$ then we can divide a by x, meaning that one multiplies a by the multiplicative inverse of x in the field: a·$x^{-1}$. It is easy to compute a·$x^{-1}$. To illustrate, again assume that n=128. Then if the last bit of a is 0, then a·$x^{-1}$ is a>>1. If the last bit of a is 1, then we must add (xor) to a>>1 the value $x^{-1}$. Since $x^{128}=x^7+x^2+x+1$ we have $x^{127}=x^6+x+1+x$ and so $x^{-1}=x^{127}+x^6+x+1=10^{120}$1000011. In summary, for n=128, a>>1 if lastbit(a)=0, and a·$x^{-1}$=

(a>>1)$\oplus 10^{120}$1000011 if lastbit(a)=1

If L$\in\{0,1\}^n$ and $i \geq -1$, we write L(i) for L·$x^i$. There is an easy way to compute L(-1), L(0), L(1), . . . , L(u), for a small number u. Namely, set L(0)=L; compute L(i)=L(i-1)·x from L(i-1), for all i$\in[1 \ldots u]$ using a shift and a conditional xor (with the formula we have given); and compute L(-1) from L by a shift and a conditional xor (with the formula we have given).

Still by way of background, a Gray code is an ordering of the points of $\{0,1\}^s$ (for some number s) such that successive points differ (in the Hamming sense) by just one bit. For n a fixed number, like n=128, OCB uses the canonical Gray code Gray(n)=($\gamma_0, \gamma_1, \ldots \gamma_{2^n-1}$). Gray(n) is defined as follows: Gray(1)=(0, 1) and Gray(s) is constructed from Gray(s-1) by first listing the strings of Gray(s-1) in order, each preceded by a 0-bit, and then listing the strings of Gray(s−1) in reverse order, each preceded by a 1 bit. It is easy to see that Gray(n) is a Gray code. What is more, $\gamma_i$ can be obtained from $\gamma_{i-1}$ by xoring $\gamma_{i-1}$ with $0^{n-1}1 \ll \text{ntz}(i)$. This makes successive strings easy to compute.

As an example, Gray(128)=(0, 1, 3, 2, 6, 7, 5, 4, . . . ). To see this, start with (0, 1). Then write it once forward and once backwards, (0,1,1,0). Then write (00, 01, 11, 10). Then write it once forward and once backwards, (00,01,11,10, 10,11,01, 00). Then write (000,001,011,010, 110, 111, 101, 100). At this point we already know the first 8 strings of Gray(128), which are (0, 1, 3, 2, 6, 7, 5, 4), where these numbers are understood to represent 128-bit strings. So, for example, $\gamma_5$ is 7 and $\gamma_6$ is 5, and $\gamma_6$=5 really is $\gamma_5$, =7 xored with 2, where 2 is the string 1 shifted left ntz(6)=1 positions.

Let $L \in \{0,1\}^n$ and consider the problem of successively forming the strings $\gamma_1 \cdot L, \gamma_2 \cdot L, \gamma_3 \cdot L, \ldots \gamma_m \cdot L$. Of course $\gamma \cdot L = 1 \cdot L = L$. Now, for $i \geq 2$, assume one has already computed $\gamma_{i-1} \cdot L$. Since $\gamma_i = \gamma_{i-1} \oplus (0^{n-1}1 \ll \text{ntz}(i))$ we know that $$\gamma_i \cdot L = (\gamma_{i-1} \oplus (0^{n-1}1 \ll \text{ntz}(i))) \cdot L$$
$$= \gamma_{i-1} \cdot L \oplus (0^{n-1}1 \ll \text{ntz}(i)) \cdot L$$
$$= \gamma_{i-1} \cdot L \oplus (L \cdot x^{\text{ntz}(i)})$$
$$= \gamma_{i-1} \cdot L \oplus L(\text{ntz}(i))$$

That is, the $i^{th}$ string in the sequence is obtained by xoring the previous string in the sequence with $L(\text{ntz}(i))$.

Had the sequence we were considering been additively offset by some value R, that is, $R \oplus \gamma \cdot L, R \oplus \gamma_2 \cdot L, \ldots, R \oplus \gamma_m \cdot L$, the $i^{th}$ string in the sequence would be formed in the same way, for $i \geq 2$, but the first string in the sequence would be $L \oplus R$ instead of L.

Definition of OCB

With the necessary notation and background now in place, we are ready to describe OCB. OCB depends on two parameters: a block cipher E, having block length n, and a tag length t, where t is a number between 1 and n. By trivial means, the adversary will be able to forge a valid ciphertext with probability $2^{-t}$.

A popular block cipher to use with OCB is likely to be the AES algorithm (AES-128, AES-192, or AES-256). As for the tag length, a suggested default of t=64 is reasonable, but tags of any length are fine.

Encryption under OCB mode requires an n-bit nonce, Nonce. The nonce would typically be a counter (maintained by the sender) or a random value (selected by the sender). Security is maintained even if the adversary can control the nonce, subject to the constraint that no nonce may be repeated within the current session (that is, during the period of use of the current encryption key). The nonce need not be random, unpredictable, or secret.

The nonce Nonce is needed both to encrypt and to decrypt. To permit maximum flexibility, it is not specified by OCB how the nonce is communicated to the Receiver, and we do not regard the nonce as part of the ciphertext. Most often the nonce would be communicated, in the clear, along with the ciphertext: for example, the nonce, in it entirety, might be prepended to the ciphertext. Alternatively, the Sender may encode the nonce using some agreed upon number of bits less than n, and this encoded nonce would be sent to the Receiver along with the ciphertext.

TABLE 1

| | |
|---|---|
| OCB-Encrypt$_K$ (Nonce,M) | |
| Partition M into M[1] • • • M[m] | // Define needed values |
| L = E$_K$(0) | // Key variant. Recall 0=0$^n$ |
| R = E$_K$ (Nonce ⊕ L) | // Base offset R |
| for i = 1 to m | // Offsets: Z[1], . . . , Z[m] |
|     do Z[i] = $\gamma_i$ • L ⊕ R | |
| Z[−m] = Z [m] ⊕ L • x$^{-1}$ | |
| for i=1 to m−1 do | // Process message blocks. . . |
|     C[i] = E$_K$(M[i] ⊕ Z[i]) ⊕ Z[i] | |
| PrePad = len(M[m]) ⊕ Z[−m] | // Process final fragment. . . |
| Pad = E$_K$(PrePad) | |
| C[m] = Pad ⊕ M[m] | // Uses Pad bits 1. . \|M[m]\| |
| C = C[1] • • • C[m] | // Ciphertext core |
| Checksum = M[1] ⊕ • • • ⊕ M[m−1] ⊕ C[m] 0* ⊕ Pad | |
| PreFullTag = Checksum ⊕ Z[m] | |
| FullTag = E$_K$ (PreFullTag) | |
| Tag = FullTag [first t bits] | |
| return C \|\| Tag | // The final ciphertext, C |

See FIG. 1 for an illustration of OCB encryption. FIG. 1 is best understood in conjunction with the algorithm definition in Table 1, which explains all of the figure's various parts and gives additional algorithmic details. The key space for OCB is the key space for the underlying block cipher E. OCB encryption is then defined in Table 1.

Referring to FIG. 1 and the algorithm definition above, one sees that the message M has been partitioned into n-bit blocks M[1], . . . , M[m−1], as well as a message fragment, M[m], which may have fewer than n bits. The message blocks and the final fragment are treated differently.

Each message block M[i] is xored with an offset (the Z[i] value), enciphered, and then xored again with the same offset. This gives a ciphertext block C[i].

The message fragment M[m] is mapped into a ciphertext fragment C[m] by xoring it with the string Pad. According to our conventions, only the first \|M[m]\| bits of Pad are used. In this way, C[m], will have the same length as M[m]. The value Pad does not depend on M[m], apart from its length. In particular, Pad is formed by enciphering the string PrePad which is the xor of the length of the final fragment M[m], encoded as a string, and the "special" offset Z[−m], which is the xor of Z[m] and $L \cdot x^{-1}$. Thus PrePad (and therefore Pad) depends on the bit length of M.

At this point, the ciphertext core C=C[1] . . . C[m] has been computed. Its length is the length of M.

A checksum is now computed by xoring together: (a) the m−1 message blocks; (b) the zero-padded ciphertext fragment, C[m]0*; and (c) the value Pad. (This is equivalent to xoring together: (a) the message blocks; (b') the zero-padded message fragment, M[m]0*; (c') the string S which is the first n−\|M[m]\| bits of Pad followed by \|M[m]\| zero-bits.) The checksum is offset using offset Z[m], giving the PreFullTag. That string is enciphered to give the FullTag. The t-bit prefix of the FullTag is used as the actual tag, Tag.

The ciphertext C is the ciphertext core C=C[1] . . . C[m] together with the tag Tag. The Nonce must be communicated along with the ciphertext C to allow the Receiver to decrypt.

Figure 2:
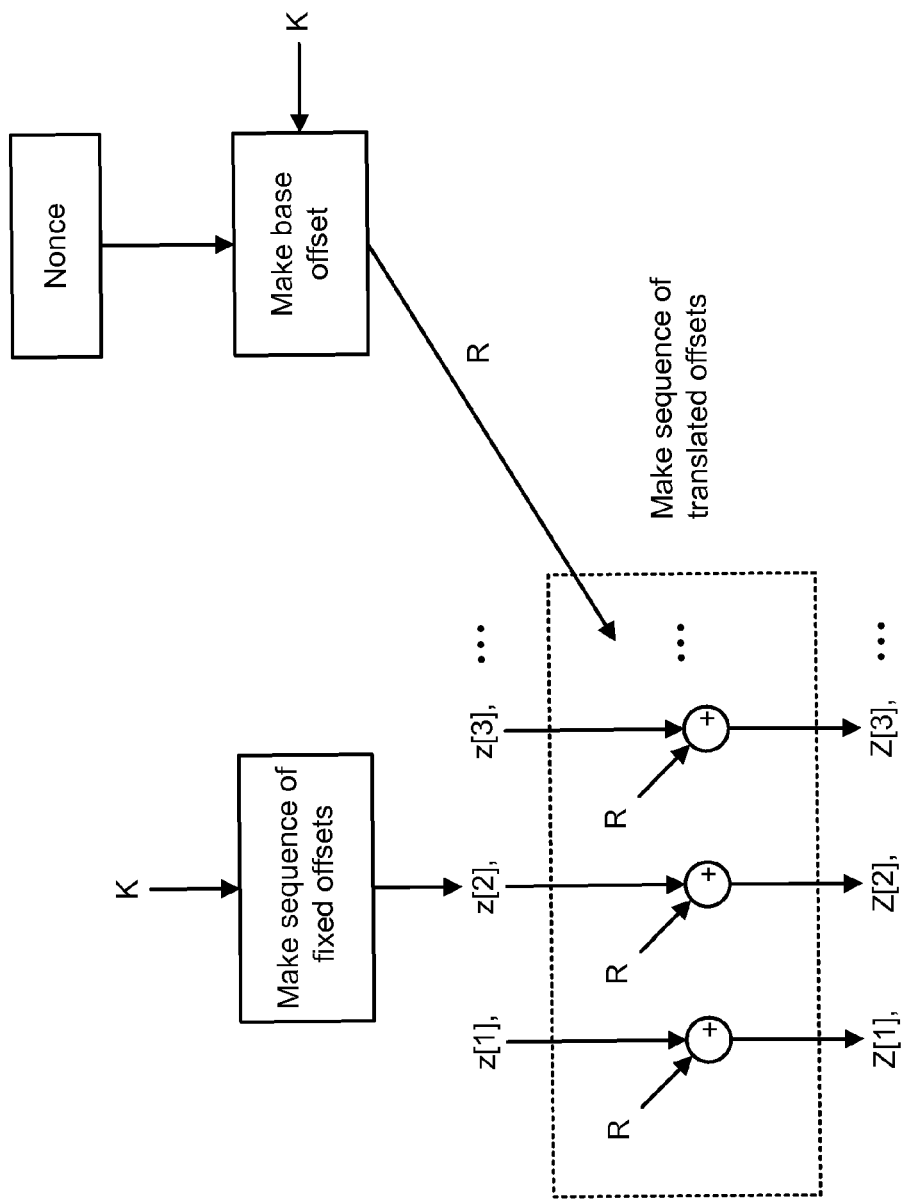
FIG. 2 is a high-level description of the make-offset process of OCB in accordance with an embodiment of the present invention.
Figure 3:
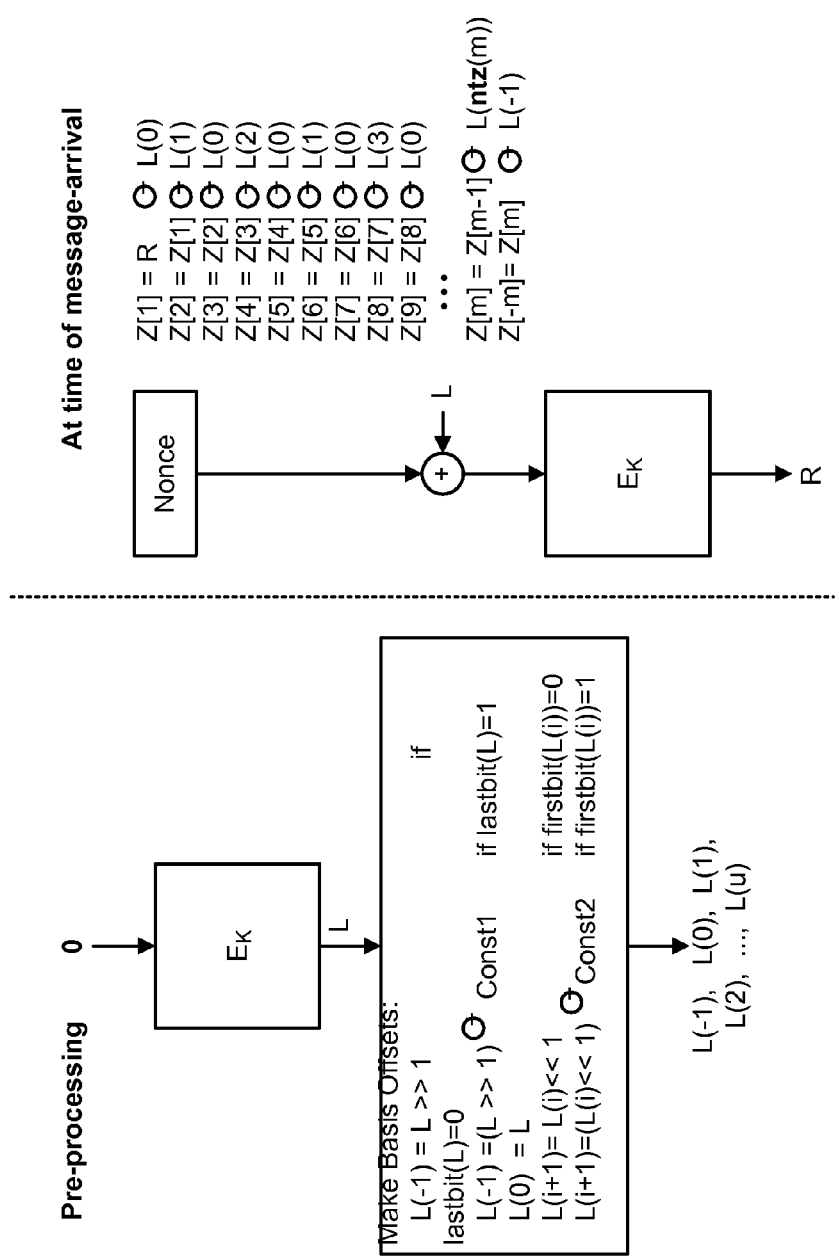
FIG. 3 is a low-level description of the make-offset process of OCB in accordance with an embodiment of the present invention.

FIGS. 2 and 3 clarify the make-offset process that is used in OCB but which is only partially depicted in FIG. 1. First, FIG. 2 depicts how the underlying key K is mapped, conceptually, into a sequence of fixed offsets z[1], z[2], z[3], . . . . We call this sequence of offsets "fixed" because it does not depend on the nonce Nonce (it only depends on the key K). The sequence of fixed offsets is mapped into a sequence of translated offsets, or simply offsets, by xoring each fixed offset with a base offset, R: that is, Z[i]=z[i]⊕R. The base offset R is determined from the nonce Nonce and from the underlying key K.

FIG. 3 shows the inventive process in more detail. The sequence of fixed offsets that we choose is $z[1]=\gamma \cdot L$, $z[2]=\gamma_2 \cdot L$, $z[3]=\gamma_3 \cdot L$, and so on. Thus the sequence of translated offsets used by OCB is $Z[1]=\gamma \cdot L \oplus R$, $Z[2]=\gamma_2 \cdot L \oplus R$, $Z[3]=\gamma_3 \cdot L \oplus R$, and so on. These offsets can be calculated in a particularly simple manner. Namely, in a pre-processing step we map L, which is a key variant determined by enciphering under K the constant string 0, into a sequence of basis offsets $L(0), L(1), L(2), \ldots$. Basis offset $L(i)$ is defined to be $L \cdot x^i$. We have already explained how to easily compute these strings. Now we compute translated offsets as follows. The first offset, $Z[1]$, is defined as $R \oplus L(0)$. Offset $Z[2]$ is computed from offset $Z[1]$ by xoring $Z[1]$ with $L(1)$. One chooses $L(1)$ because we are making offset number 2 and the number 2, written in binary, ends in 1 zero-bit. Offset $Z[3]$ is computed from offset $Z[2]$ by xoring $Z[2]$ with $L(0)$. One chooses $L(0)$ because we are making offset 3 and 3, written in binary, ends in 0 zero-bits. Offset $Z[4]$ is computed from offset $Z[3]$ by xoring into $Z[3]$ with $L(2)$. One chooses $L(2)$ because we are making offset 4 and 4, written in binary, ends in 2 zero-bits. One continues in this way, constructing each (translated) offset from the prior offset by xoring in the appropriate $L(i)$ value.

Figure 4:
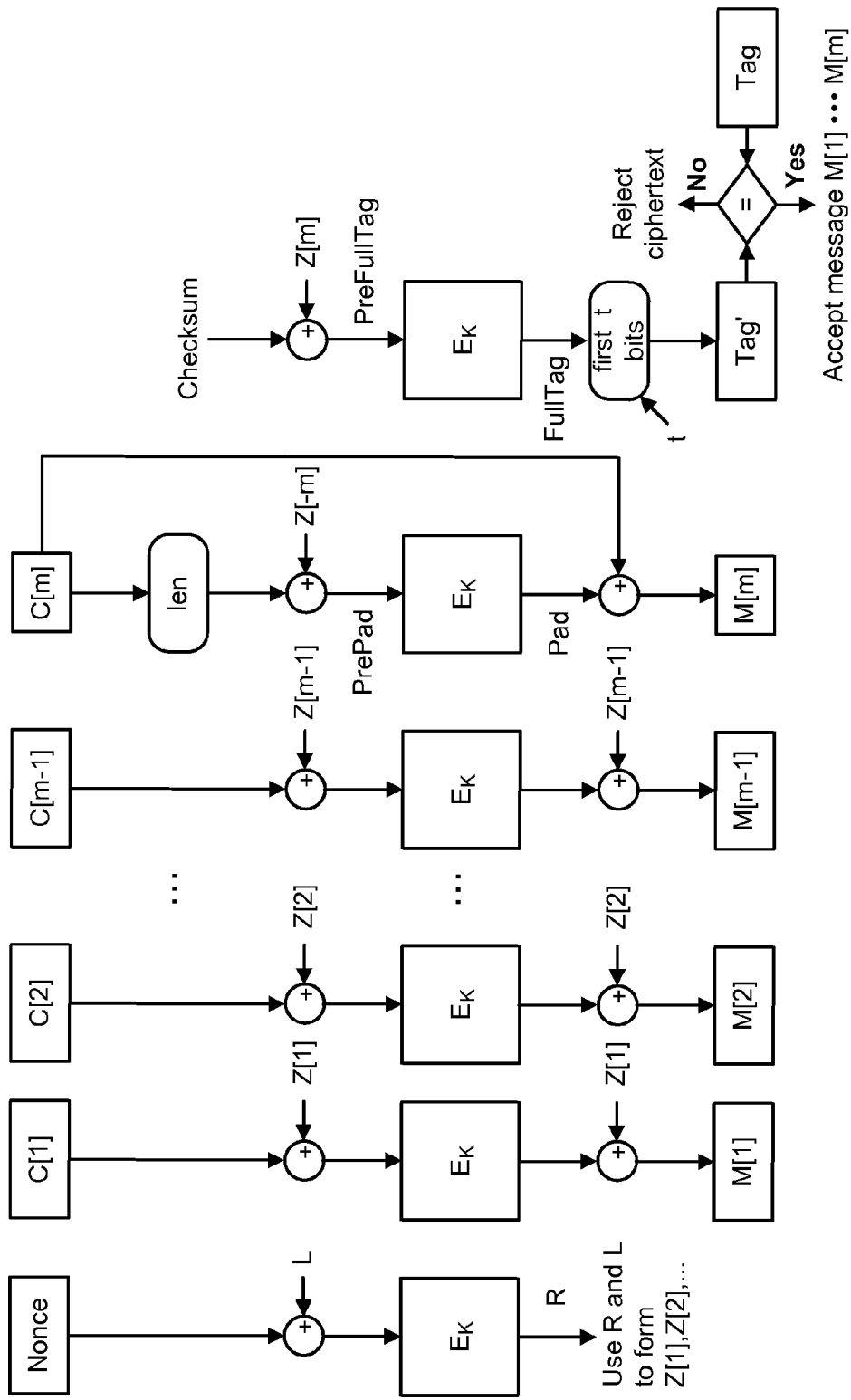
FIG. 4 describes decryption under OCB in accordance with an embodiment of the present invention.

Decryption in OCB works in the expected way. The algorithm is shown in FIG. 4 and is defined as follows. All parts of FIG. 4 can be understood by consulting the algorithm definition that appears in Table 2.

TABLE 2

OCB-Decrypt$_K$ (Nonce, C)
Partition C into $C[1] \cdots C[m]$ Tag
$L = E_K(0)$
$R = E_K(\text{Nonce} \oplus L)$
for i = 1 to m do $Z[i] = \gamma_i \cdot L \oplus R$
$Z[-m] = Z[m] \oplus L \cdot x^{-1}$
for i = 1 to m−1 do
    $M[i] = E_K^{-1}(C[i] \oplus Z[i]) \oplus Z[i]$
PrePad = $\text{len}(C[m]) \oplus Z[-m]$
Pad     = $E_K$ (PrePad)
$M[m]$   = Pad $\oplus$ C[m]
M       = $M[1] \cdots M[m]$
Checksum = $M[1] \oplus \cdots \oplus M[m-1] \oplus C[m]0^* \oplus$ Pad
Tag' = $E_K$ (Checksum $\oplus$ Z [m]) [first t bits]
if Tag = Tag' then return M
          else return invalid An Alternative Description At this point, we have fully described the embodiment OCB. Still, the following alternative description may help to clarify what a typical implementation might choose to do.

Key generation: Choose a random key K from the key space for the block cipher. The key K is provided to both the entity that encrypts and the entity that decrypts.

Key setup: With the key now distributed, the following can be pre-computed:

1. Setup the block-cipher key. For the party that encrypts: do any key setup associated to enciphering using the block-cipher with key K. For the party that decrypts: do any key setup associated to enciphering or deciphering using the block-cipher with key K.
2. Pre-compute L. Let $L=E_K(0)$.
3. Pre-compute $L(i)$-values. Let $m_{max}$ be at least as large as the number of n-bit blocks in any message to be encrypted or decrypted. Let $u=\lceil \log_2 m_{max} \rceil$. Let $L(0)=L$ and, for $i \in [1 \ldots u]$, compute $L(i)=L(i-1) \cdot x$ using a shift and a conditional xor, in the manner already described. Compute $L(-1)=L \cdot x^{-1}$ using a shift and a conditional xor, in the manner already described. Save $L(-1), L(0), \ldots, L(u)$ in a table.

Encryption: To encrypt message $M \in \{0,1\}^*$ using key K nonce Nonce $\in \{0,1\}^n$, obtaining ciphertext C, do the following:

1. Partition M. Let $m=\lceil |M|/n \rceil$. If m=0 then replace m by 1. Let $M[1], \ldots, M[m]$ be strings such that $M[1] \ldots M[m]=M$ and $|M[i]|=n$ for all $i \in [1 \ldots m-1]$.
2. Initialize variables. Let Offset=$E_K$(Nonce$\oplus$L). Let Checksum=0.
3. Encipher all blocks but the last one. For i=1 to m−1, do the following:
    Let Checksum=Checksum$\oplus M[i]$.
    Let Offset=Offset$\oplus L(\text{ntz}(i))$.
    Let $C[i]=E_K(M[i]\oplus\text{Offset})\oplus\text{Offset}$.
4. Mask the final fragment and finish constructing the checksum:
    Let Offset=Offset$\oplus L(\text{ntz}(m))$.
    Let Pad=$E_K(\text{len}(M[m])\oplus L(-1)\oplus\text{Offset})$.
    Let $C[m]=M[m]\oplus$(the first $|M[m]|$ bits of Pad).
    Let Checksum=Checksum$\oplus$Pad$\oplus C[m]0^*$.
5. Form the tag. Let Tag be the first t bits of $E_K(\text{Checksum}\oplus\text{Offset})$.
6. Return the ciphertext. The ciphertext is defined as the string $C=C[1] \ldots C[m-1]C[m]\|$Tag. It is communicated along with the nonce Nonce to the Receiver.

Decryption: To decrypt a ciphertext $C \in \{0,1\}^*$ using key K and nonce Nonce$\in \{0,1\}^n$, obtaining a plaintext $M \in \{0,1\}^*$ or else an indication invalid, do the following:

1. Partition the ciphertext. If $|C|<t$ then return invalid (the ciphertext has been rejected). Otherwise, let C be the first $|C|-t$ bits of C and let Tag be the remaining t bits. Let $m=\lceil |C|/n \rceil$. If m=0 then let m=1. Let $C[1], \ldots, C[m]$ be strings such that $C[1] \ldots C[m]=C$ and $|C[i]|=n$ for $i \in [1 \ldots m-1]$.
2. Initialize variables. Let Offset=$E_K$(Nonce $\oplus$L). Let Checksum=0.
3. Recover all blocks but the last one. For i=1 to m−1, do the following:
    Let Offset=Offset$\oplus L(\text{ntz}(i))$.
    Let $M[i]=E_K^{-1}(C[1]\oplus\text{Offset})\oplus\text{Offset}$.
    Let Checksum=Checksum$\oplus M[i]$.
4. Recover the final fragment and finish making the checksum:
    Let Offset=Offset$\oplus L(\text{ntz}(m))$.
    Let Pad=$E_K(\text{len}(C[m])\oplus L(-1)\oplus\text{Offset})$.
    Let $M[m]=C[m]\oplus$(the first $|C[m]|$ bits of Pad).
    Let Checksum=Checksum$\oplus$Pad$\oplus C[m]0^*$.
5. Check the tag. Let Tag' be the first t bits of $E_K(\text{Checksum}\oplus\text{Offset})$. If Tag$\neq$Tag' then return invalid (the ciphertext has been rejected). Otherwise,
6. Return the plaintext. The plaintext that is returned is defined to be $M=M[1] \ldots M[m-1] M[m]$.

Variations

While many variants of OCB result in incorrect algorithms, there are also many correct variants. One type of variant leaves the structure of OCB alone, but changes the way offsets are produced. When changing the way that offsets are produced, one may also have to change the semantics of the xor operation. We give a couple of examples.

For an "addition mod $2^n$ variant" of OCB, one might change the offsets to $Z[i]=(R+iL) \mod 2^n$, for $i \geq 1$, and $Z[-m]=\text{complement}(Z[m])$ (the bit-wise complement of $Z[m]$). According to this definition, each offset is computed from the prior one by n-bit addition of L. Alternatively, replace complement($Z[m]$)) by $-Z[m] \mod 2^n$, where is nearly the same thing (the two differ by a constant, 1, and this difference is irrelevant).

Assuming n is a multiple of the word size of a computer, addition mod $2^n$ is easily computed by a computer. We call addition mod $2^n$ "computer addition". Computer addition might or might not generate a carry. To achieve addition modulo $2^n$ any carry that is generated is simply ignored.

Alternatively, for $i \geq 1$, one could define $Z[i]=iR \bmod 2^n$, so that each offset is obtained from the prior one by n-bit addition of R instead of L.

When defining offsets using computer addition, the xor operations used to combine a message block and an offset, and the xor operations used to combine a block-cipher output and an offset, should be replaced by mod $2^n$ addition. Leaving these operations as xors seems to damage the schemes' security.

For a "mod p variant" of OCB, where p is a large prime number (for example, the smallest prime number less than $2^n$), change the offsets to $Z[i]=(R+iL) \bmod p$, for $i \geq 1$, and $Z[-m]=\text{complement}(Z[m])$. According to this definition, each offset is computed from the prior one by n-bit addition of L. The complement($Z[m]$) can be replaced by $-Z[m] \bmod p$, which is nearly the same thing (the two differ by a constant, 1, and this difference is irrelevant).

Alternatively, for $i \geq 1$, one could define $Z[i]=iR \bmod p$, so that each offset is obtained from the prior one by n-bit addition of R instead of L.

When defining offsets using addition modulo p, the xor operations used to combine a message block and an offset, and then used to combine a block-cipher output and an offset, could be replaced by mod p addition. However, this does not seem to be essential.

An efficiency improvement can be made to the mod p schemes for offset production: define $Z[i]$ not as $(Z[i-1]+L) \bmod p$, where an implementation would always have to check if the sum is p or larger, but by doing the (mod p)-reduction in a "lazy" manner, according to the carry bit produced by computer addition. Namely, form $Z[i]$ by computer addition of n-bit numbers L and $Z[i-1]$. If the addition generates a carry bit, then add into the sum the number $\delta=2^n-p$. This method results in $Z[i]$ being equal to one of two possible values: $(iL+R) \bmod p$, or $p+((iL+R) \bmod p)$. The latter is only a possibility in (rare) case that the indicated sum is less than $2^n$. Thus the sequence of offsets is not little changed, yet an implementation is more efficient since it only has to make an adjustment to the computer-addition sum when a carry is generated. The carry will typically be computed "for free" in a modern processor. We call this method of offset production lazy mod p addition.

Lazy mod p addition also works as a modification to the $Z[i]=iR \bmod p$ method; namely, define $Z[1]=R$ and $Z[i]=(Z[i-1]+R) \bmod 2^n$ if the indicated computer addition does not generate a carry, and define $Z[i]=(Z[i-1]+R+\delta) \bmod 2^n$ if the first addition does generate a carry.

Other variants of OCB change minor details in the structure of the algorithm. For example, the value $L \cdot x^{-1}$ used in forming the PrePad can be replaced by the value $L \gg 1$. These two possibilities are nearly the same thing: recall that $L \cdot x^{-1}$ is actually equal to $L \gg 1$ if L ends in a 0 bit, and, if L ends in a 1 bit, $L \cdot x^{-1}$ differs from $L \gg 1$ by a fixed constant. Thus there is no practical difference between $L \cdot x^{-1}$ and $L \gg 1$. This is exactly analogous to the use of $-A \bmod p$ verses complement(A) in an addition mod p based scheme; or $-A \bmod 2^n$ verses complement(A) in an addition mod $2^n$ based scheme.

More structural changes can be made to OCB while preserving its basic ideas. The intuition for the manner in which OCB processes the final fragment and then produces the tag is to ensure that the PreFullTag appreciably depends not only on the message blocks, but also on (a) the message fragment/ciphertext fragment, and (b) the length of the message. As an example alternative, one might change the Z[-m] offset to Z[m], and change the Z[m] offset to Z[-m].

Figure 5:
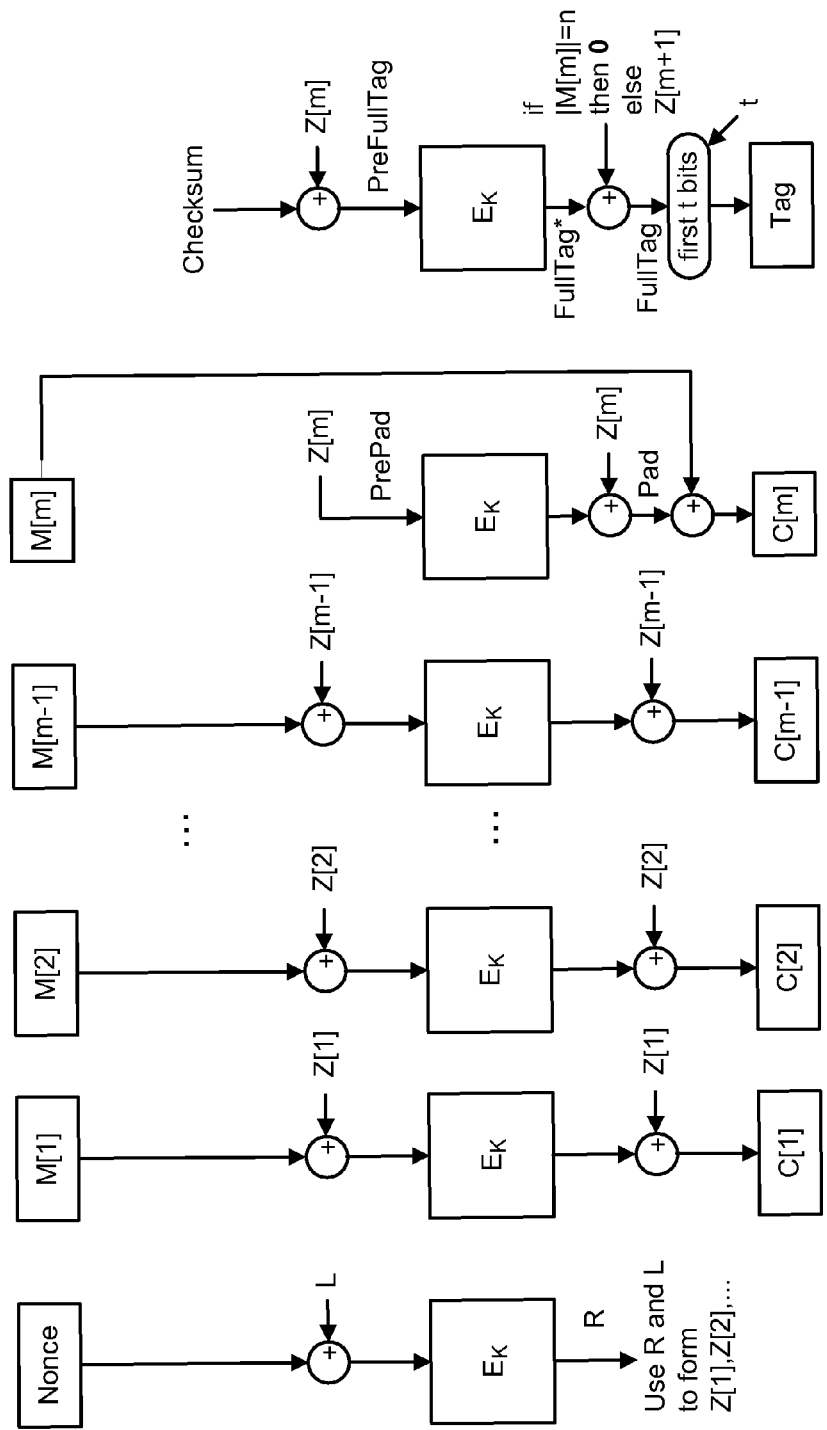
FIG. 5 describes a variant of OCB in accordance with an embodiment of the present invention.
Figure 6:
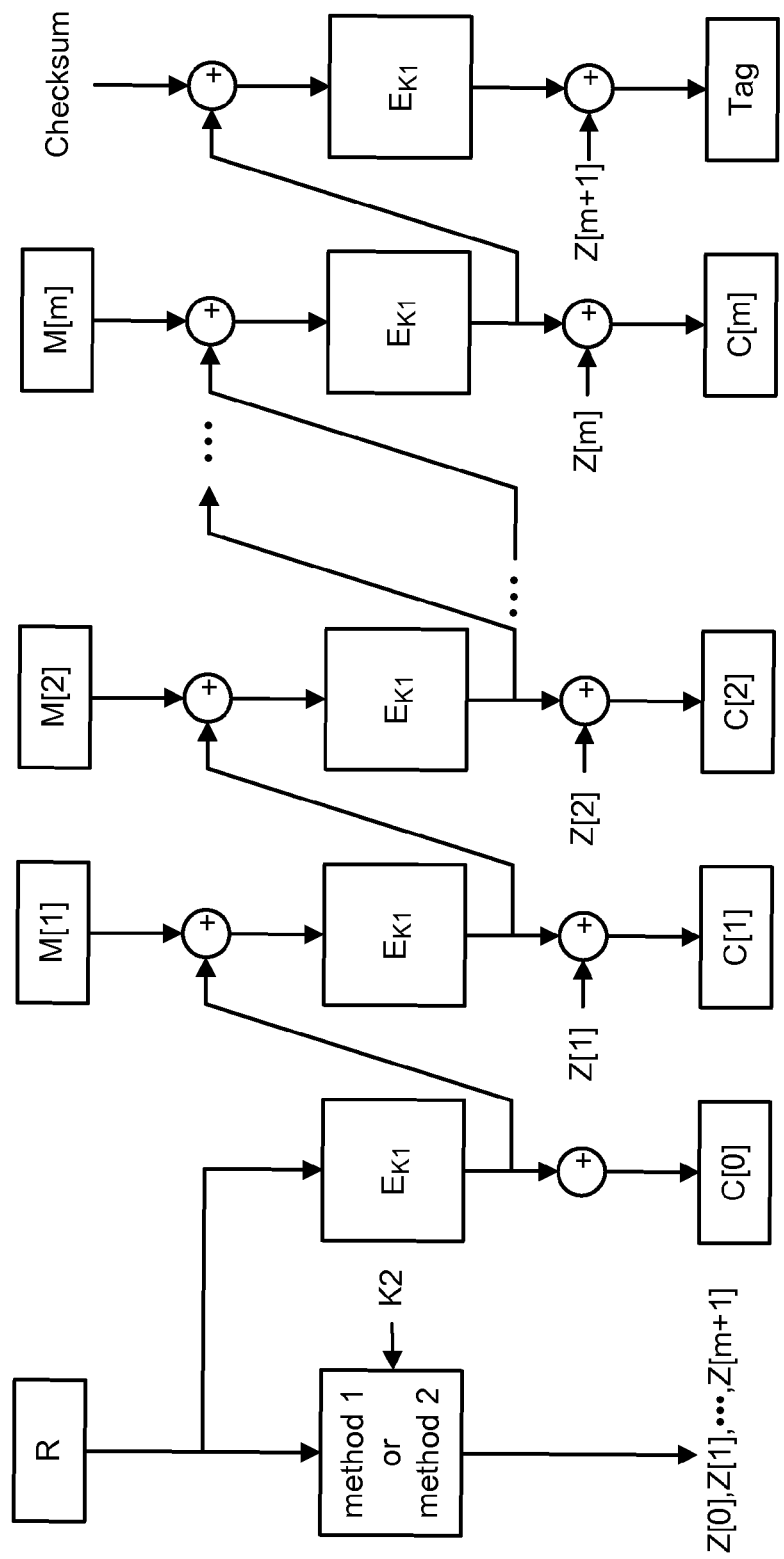
FIG. 6 depicts the IACBC scheme of Jutla.
Figure 7:
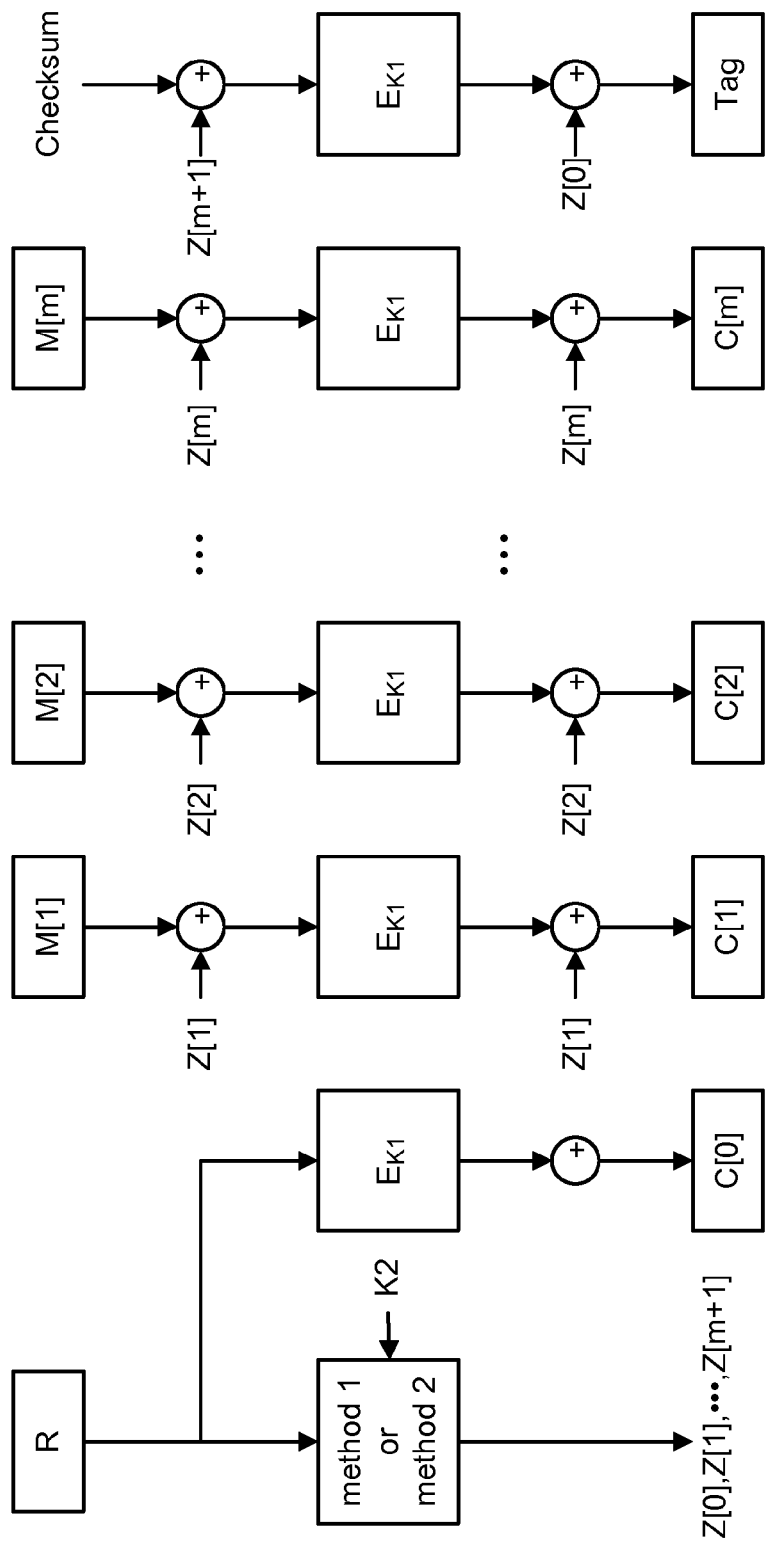
FIG. 7 depicts the IAPM scheme of Jutla.
Figure 8:
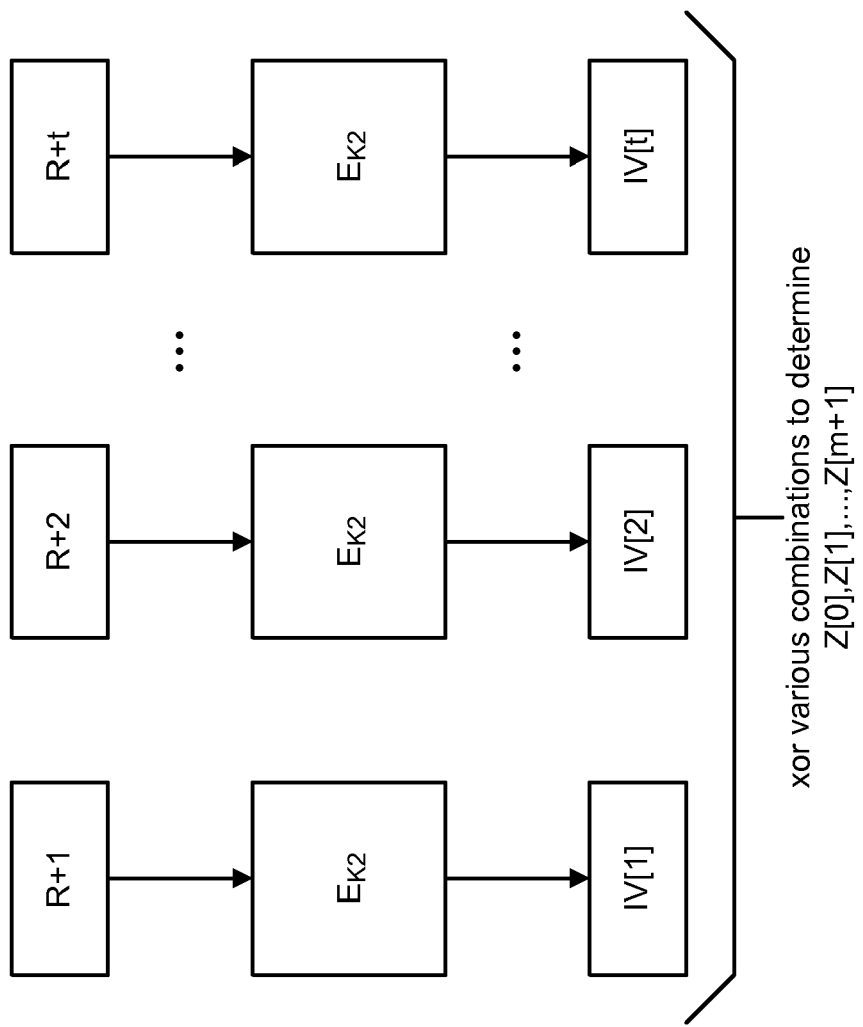
FIG. 8 depicts one of Jutla's methods for constructing offsets.
Figure 9:
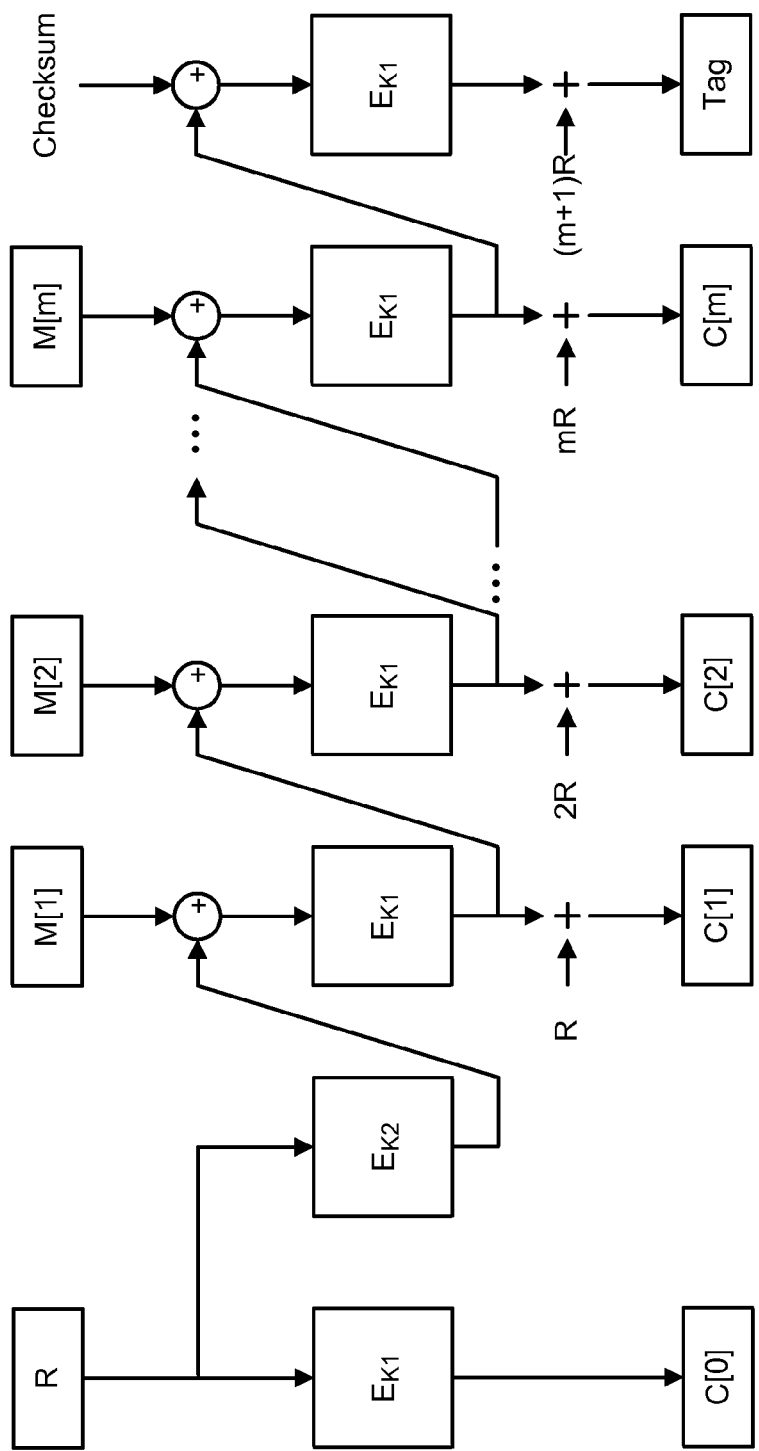
FIG. 9 depicts the XCBC$ scheme of Gligor and Donescu.
Figure 10:
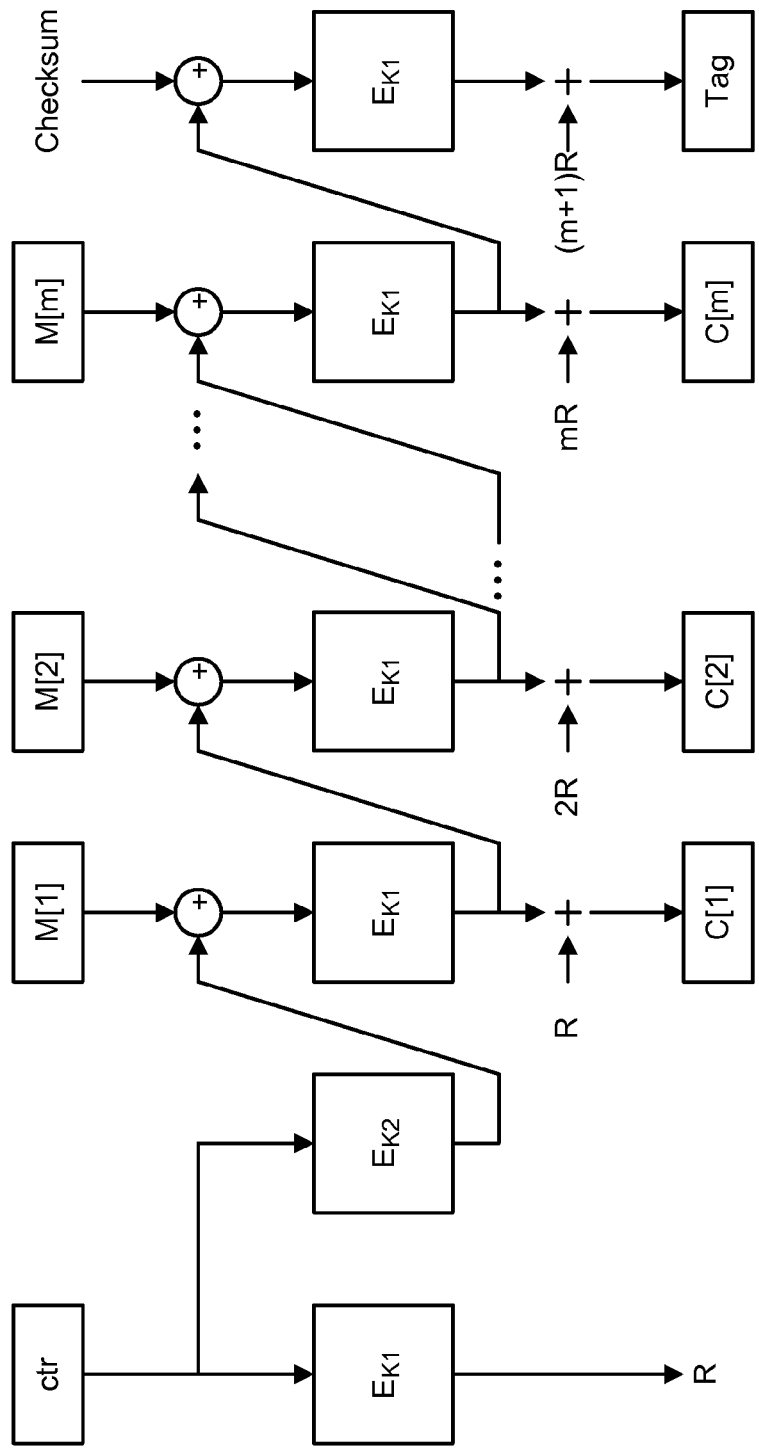
FIG. 10 depicts the XCBC scheme of Gligor and Donescu.

It is even possible to allow PreFullTag to inadequately depend on the message fragment/ciphertext fragment, as long as this dependency is realized in the FullTag itself. An example of such an OCB variant is shown in FIG. 5. In that variant, Pad does not depend on the bit length of M[m], but only on the block length of M. The checksum is defined differently from before; it is now defined by Checksum=M[1]$\oplus \ldots \oplus$M[m-1]$\oplus$pad(M[m]), where pad(A)=A if A is n bits long and pad(A)=A$\|10^{n-|A|-1}$ otherwise. With such a scheme, PreFullTag would seem to inadequately depend on the message; for example, $1^n$ and $1^{n-1}$ give rise to identical checksums, as well as ciphertext cores that differ by just one bit. So if the authentication tag were taken to be FullTag*, the scheme would be insecure. To differentiate pairs of strings like $1^n$ and $1^{n-1}$, the scheme of FIG. 5 modifies the value FullTag*=$E_K$(PreFullTag) by xoring it with one of two different offsets, 0 or Z[m+1]. The first offset is used if the message fragment is n bits long (so no padding was appended to the message fragment when forming the checksum), while the second offset is used when the message fragment has fewer than n bits (so 10* padding was appended to it when forming the checksum). Now strings such as $1^n$ and $1^{n-1}$ will give rise to the same FullTag* but different FullTag values.

Many other correct variants of OCB are possible, as a person skilled in the art will now be able to discern.

A variant in a different direction is to facilitate the efficient processing of associated-data. Associated-data refers to information which the Receiver would like to ensure that he shares (in identical form) with the Sender, but where this information is not a part of the message that is being encrypted. Such information is usually non-secret, and it is usually held static during the course of a session (that is, all messages encrypted using a given key will usually share the same associated-data). The associated-data is a vector of strings AD, or it is a single string AD that encodes such a vector of strings.

An authenticated-encryption scheme that permits associated-data can be regarded as an authenticated-encryption scheme in which there is an extra argument, AD, supplied to both the encryption function E and the decryption function D. The Sender encrypts using $E_K$(Nonce, AD, M) while the Receiver decrypts using $D_K$(Nonce, AD, C). If the Receiver supplies an AD-value which is different from the one which the Sender used, the ciphertext C, on decryption, will almost certainly be regarded as invalid.

A method to allow for associated-data that will be obvious to those skilled in the art is to have the Sender encode AD along with the message M, obtaining an augmented message M', and then have the Sender encrypt M', with authenticity, using an authenticated-encryption scheme. But this method is inefficient, insofar as the ciphertext C' that one obtains is longer than a ciphertext C would be for M. The increase in length is by an amount proportional to the length of AD. Also, extra processing time is needed to encrypt and to decrypt (even when AD is held constant across many messages).

The inventive methods permit more efficient processing of associated-data than what is described above. We illustrate the method for encryption under $OCB_K$(Nonce, AD, M). Let F be a function of the key K and the associated-data AD. The inventive method begins by computing $\Delta = F_K(AD)$. In a first technique, ciphertext $OCB_K$(Nonce, AD, M) is then defined as $OCB_\Delta$(Nonce, M). In an alternative technique, the ciphertext $OCB_K$(Nonce, AD, M) is defined as $OCB_K$(Nonce$\oplus \Delta$, M). In yet another alternative, ciphertext $OCB_K$(Nonce, AD, M) is defined as (C, Tag⊕Δ), where (C,T)=$OCB_K$(Nonce, M). Decryption proceeds according to the obvious associated algorithm, as those skilled in the relevant art will infer. Other ways to modify the process of computing ciphertexts under $OCB_K$(Nonce, M) which make use of Δ will be apparent to those skilled in the relevant art.

The inventive method has the advantage that the ciphertext is not lengthened because of the presence of the associated-data, and the processing time is not significantly increased, assuming that Δ has been pre-computed.

The description of the inventive method uses one key K for both $F_K(·)$ and $OCB_K(·, ·)$. This is advantageous, but two separate keys may of course be used instead.

There are many options for realizing the function F used above. For example, F may be the CBC MAC described earlier. Alternatively, F may be obtained from a cryptographic hash function, or from a universal hash function.

There are also many options for realizing the encoding of a vector of strings AD into a string AD. For example, one can concatenate an encoding of each string in the vector of strings, where the encoding of each string in the vector of strings consists of a fixed-byte encoding of the string's length, followed by the string itself.

The associated-data techniques we have described are applicable to any authenticated-encryption scheme, without restriction. The technique can be used in conjunction with the other inventive teachings, or the technique can be used independently. Its use in conjunction with other inventive teachings does not limit the scope of those teachings, and mechanisms which allow the presence of associated-data should be understood as covered by claims which do not explicitly refer to the presence of associated-data.

Description of OCB in Terms of a Tweakable Block Cipher

A convenient way to conceptualize OCB is in terms of a tweakable block cipher, a notion suggested by Richard Schroeppel in his paper *The hasty pudding cipher*, which was submitted to the National Institute of Standards and Technology (NIST) in 1998 as an Advanced Encryption Standard (AES) candidate and is available on a NIST web page. The notion of a tweakable block cipher was later named and studied by Liskov, Rivest, and Wagner in their paper *Tweakable block ciphers*, published in *Advances in Cryptology—CRYPTO 2002*, Lecture Notes in Computer Science, vol. 2442, Springer-Verlag, 2002, who also pointed out the utility of the concept in understanding the workings of OCB.

A tweakable block cipher E (bold E) is like an ordinary block cipher E except that it takes one further argument, the tweak. The tweak was originally called the spice in Schroeppel's paper. A tweakable block cipher E thus takes three values as input: a key K, a tweak T, and a plaintext block X having some fixed number n of bits. The output is a ciphertext block Y=E(K,T, X) having n bits. The block length will usually be n=64 or n=128 bits. It is required that for each key K and tweak T, the function E(K,T,·) is a permutation on the set of n-bit strings. For a tweakable block cipher to be deemed good it is necessary that as the tweaks T vary, the different block ciphers named by each tweak act independently from one another; it is as though each tweak T specifies its own different version of the block cipher. The space of allowed tweaks depends on the tweakable block cipher E.

Figure 11:
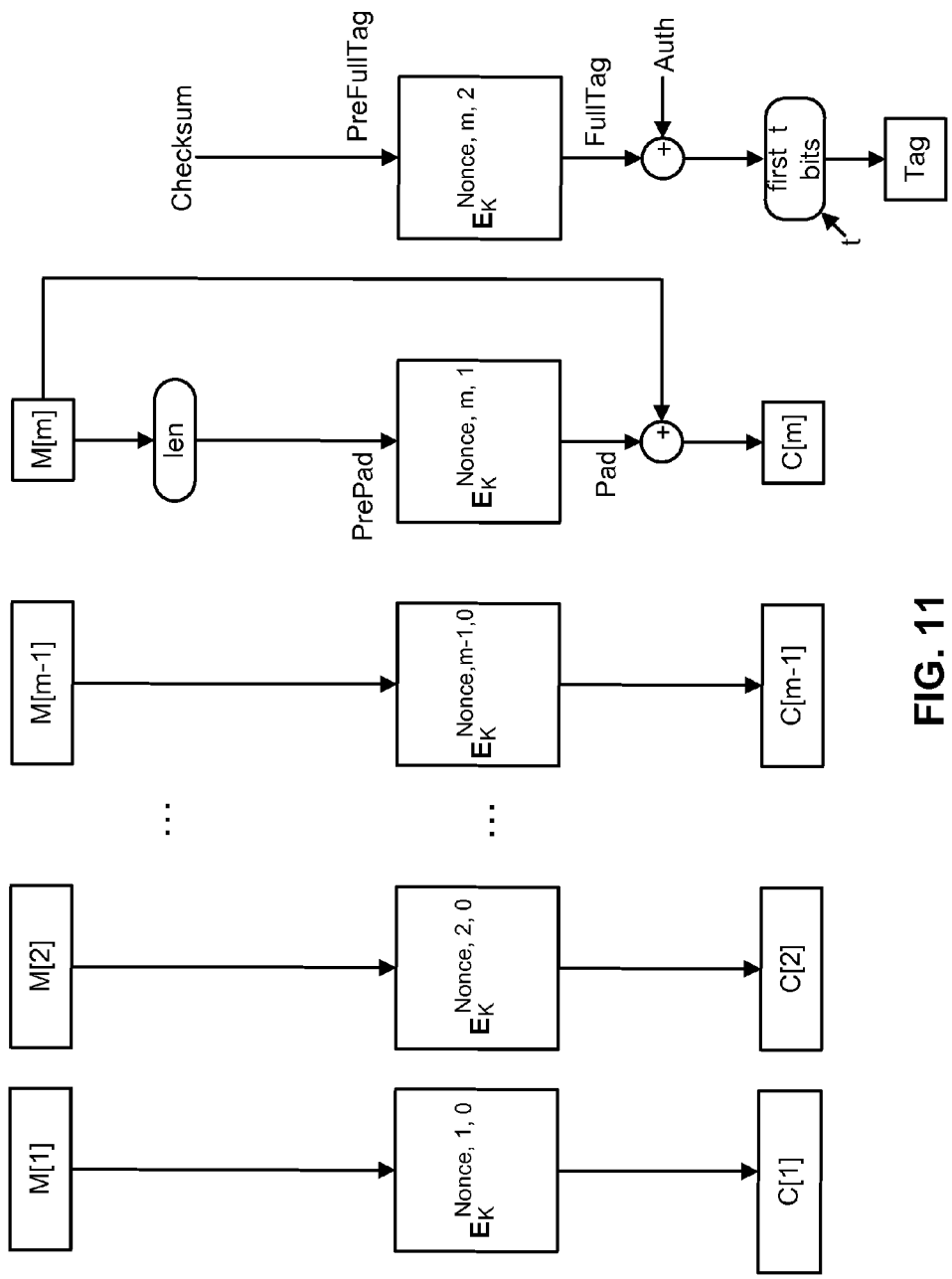
FIG. 11 depicts encryption under OCB-from-a-tweakable-block-cipher, a generalization of OCB recast to use a different kind of primitive in accordance with an embodiment of the present invention.

We now describe OCB in terms of a tweakable block cipher, the mechanism that we call OCB-from-a-tweakable-block-cipher. See FIG. 11, where encryption under OCB-from-a-tweakable-block-cipher utilizes a tweakable block cipher E that takes tweaks that are triples of values. In the figure, the tweak T for the blockcipher E is written as a superscript to E and the key K of E is written as a subscript.

The first component in E's tweak is the nonce Nonce. This nonce would typically be an n-bit string. It need not be a counter or a random value; it may be any value that, with high probability, is used at most once during a session. The second component in E's tweak is an integer index. The minimal value for this index is 1 and the maximal possible value $m_{max}$ is the length of the longest message that can be encrypted with the scheme, measured in n-bit blocks. The third component of the tweak is 0, 1, or 2.

To encrypt a message M using a key K and nonce Nonce, the message is first partitioned into M[1] ... M[m] where each block M[i] has n bits except for the last block M[m], which may be shorter. The final block M[m] is called the message fragment. For each position i between 1 and m−1, plaintext block M[i] is encrypted into a ciphertext block C[i] by applying the tweakable block cipher E to M[i], the tweakable block cipher keyed by K and tweaked by (Nonce, i, 0). To encrypt the message fragment M[m], the tweakable block cipher E is first applied to the n-bit string that encodes the length of M[m], the tweakable block cipher E keyed by K and tweaked by (Nonce, m, 1). The result of this tweakable block cipher call is an n-bit string Pad, the |M[m]|-bit prefix of which is xored with M[m] to obtain the ciphertext fragment C[m]. Next an n-bit string Checksum is computed by xoring together M[1], ..., M[m−1], Pad, and C[m]0*, the last string denoting, as before, C[m] with enough 0-bits appended at the end to bring the resulting string to n bits. The tweakable block cipher E is applied to Checksum to obtain the authentication tag FullTag, this invocation of the tweakable block cipher keyed by K and tweaked by the triple (Nonce, m, 2). The string FullTag is then modified by xoring in the n-bit string Auth that results from applying a pseudorandom function F, keyed by K, to associated-data AD and then truncating the result to some desired number t of bits, obtaining an authentication tag Tag. The final ciphertext is C=C[1] ... C[m] Tag, which is transmitted along with the nonce Nonce and the associated-data AD to the receiver. The portion C[1] ... C[m] of C is called the ciphertext core. It's length is the same length as M=M[1] ... M[m] even when M[m] has fewer than n bits. (Obviously padding M would not obtain this property.) The receiver recovers the message M from C in the natural way, making sure to check that the tag Tag that is received is the tag that is expected for this ciphertext, given the nonce and the associated-data.

There are many ways to realize OCB-from-a-tweakable-block-cipher using a conventional block cipher E. Each way requires constructing the needed tweakable block cipher E from a conventional block cipher E. Our prior definition of OCB corresponds to implementing E from E according to:

$$\mathbf{E}(K,(\text{Nonce},i,0),X) = \Delta \oplus E_K(X \oplus \Delta) \text{ and}$$

$$\mathbf{E}(K,(\text{Nonce},i,1),X) = E_K(X \oplus \Delta \oplus L \cdot x^{-1}) \text{ and}$$

$$\mathbf{E}(K,(\text{Nonce},i,2),X) = E_K(X \oplus \Delta) \text{ if } j=2, \text{ where}$$

$\Delta = \gamma_i \cdot L \oplus R$ and $R = E_K(\text{Nonce})$ and $L = E_K(0)$. Recall that · denotes multiplication in the finite field with $2^n$ elements, while $\gamma_i$ denotes the $i^{th}$ string in a Gray-code-ordered sequence of strings. Thus the OCB mechanisms specified earlier is the particular instantiation of OCB-from-a-tweakable-block-cipher.

An alternative instantiation of the tweakable block cipher E from a conventional block cipher E is to set $$\mathbf{E}(K,(\text{Nonce},i,0),X) = \Delta \oplus E_K(X \oplus \Delta) \text{ where } \Delta = 2^i \cdot L \text{ and } L = E_K(\text{Nonce}),$$

$E(K,(\text{Nonce},i,1),X)=E_K(X\oplus\Delta)$ where $\Delta=2^i\cdot L$ and $L=E_K(\text{Nonce})$, and $E(K,(\text{Nonce},i,2),X)=E_K(X\oplus\Delta)$ where $\Delta=2^i\cdot 3\cdot L$ and $L=E_K(\text{Nonce})$.

We emphasize that the · operator is not multiplication of integers but multiplication in the field with $2^n$ elements. The $2^i$· operation is carried out by repeatedly doing left shifts and a conditional xors (a total of i times). Multiplication by 3 (the ·3 operation) is a left shift, a conditional xor, and then an xor.

Figure 12:
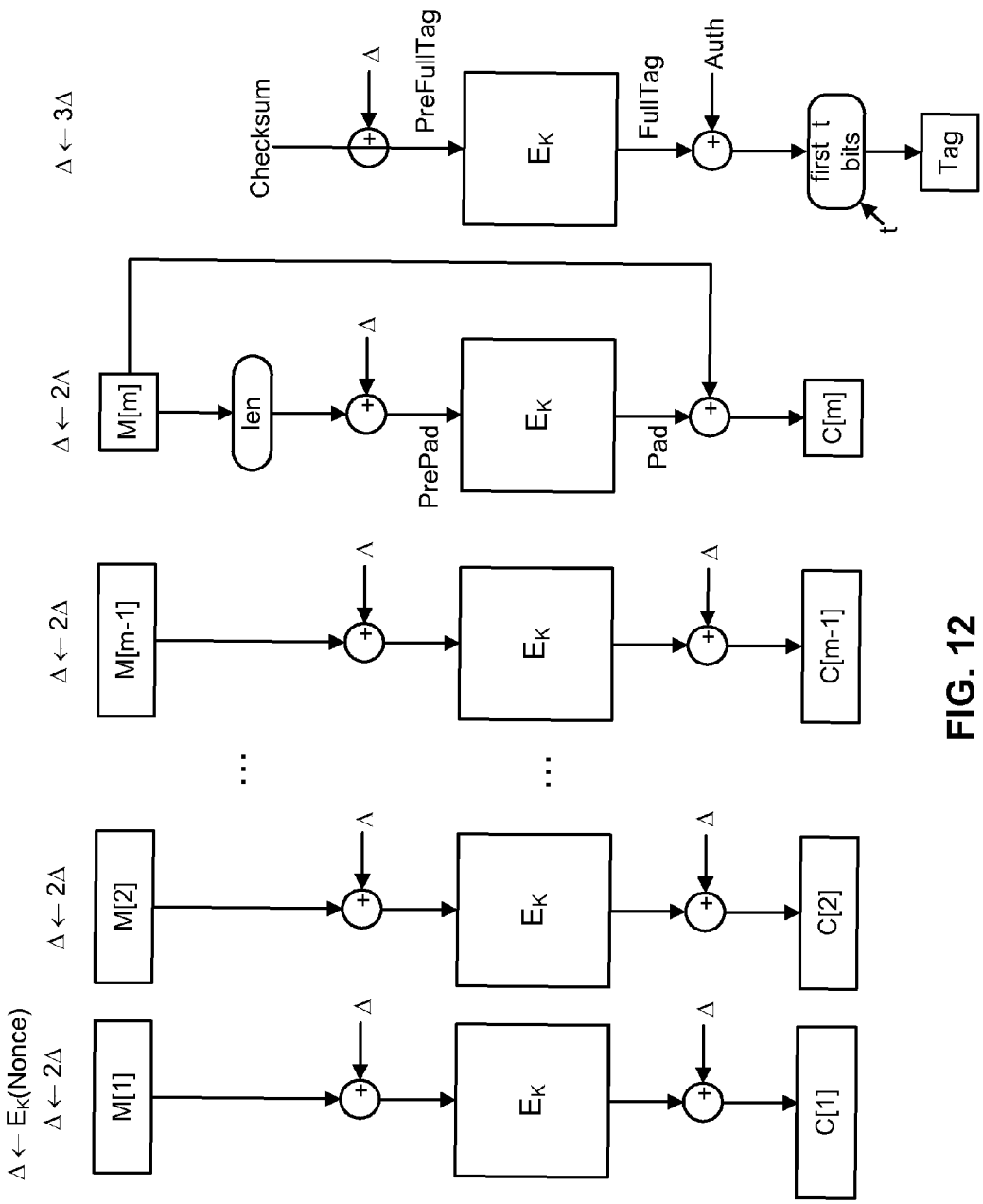
FIG. 12 depicts encryption under OCB 2.0, a second embodiment of the ideas of this invention in accordance with an embodiment of the present invention.

In FIG. 12 we describe the above instantiation of OCB-from-a-tweakable-block-cipher in terms of the conventional block cipher E from which E was built. We call the algorithm OCB 2.0. The party that encrypts has a plaintext message M=M[1] . . . M[m] where each M[i] is n bits except for the message fragment M[m], which may have fewer than n bits. The party that wants to encrypt M also has an n-bit nonce Nonce and a key K for the conventional n-bit block cipher E, and it has associated-data AD. An initial offset $\Delta$ is computed as $\Delta=E_K(\text{Nonce})$. Then, for each i between 1 and m−1, the following is done: replace $\Delta$ by $2\cdot\Delta$, the latter computed using a shift and a conditional xor, and let C[i] be computed as $C[i]=E_K(M[i]\oplus\Delta)\oplus\Delta$. When all m−1 full blocks are processed the value $\Delta$ is again replaced by $2\cdot\Delta$ and C[m] is obtained by xoring M[m] with the first |M[m]| bits of Pad=$E_K$(|M[m]|⊕$\Delta$). Next the string Checksum is computed by xoring together C[1], . . . , C[m−1], Pad, and C[m]0*. Replace $\Delta$ by $3\cdot\Delta$. The string FullTag=$E_K$(Checksum⊕$\Delta$) is now computed. This value is xored with Auth=$F_K$(AD) and then truncated to t bits to get the tag Tag. The ciphertext is C=C[1] . . . C[m] Tag. This is transmitted along with the nonce Nonce and the associated-data AD. Decryption proceeds in the natural way. The encryption and decryption algorithms are specified textually in Table 3.

The main advantage of OCB 2.0 over OCB is that offset computation is simpler, with each offset being computed from the prior one by a shift and conditional xor (the last offset requires one extra xor). Each offset computation is therefore constant time and can be implemented with very simple hardware or software. In addition, OCB 2.0 accommodates associated-data, this being handled in a particularly efficient way (near zero per-message cost when associated-data is held fixed). Other efficiency characteristics of OCB and OCB 2.0 are the same; in particular, potentially expensive multiplication in the ring of integers modulo $2^n$ is avoided; messages of arbitrary bit length can be encrypted and the resulting ciphertext core C[1] . . . C[m] will always have identical length as the plaintext M[1] . . . M[m]; a single key is used for all block-cipher invocations; and no random numbers or counters are employed—an arbitrary nonce is sufficient.

TABLE 3

OCB2-Encrypt$_K$ (Nonce, AD, M)
Partition M into M[1] • • • M[m]
$\Delta$ = E$_K$(Nonce)
for i=1 to m−1 do
    $\Delta$ = 2 • $\Delta$
    C[i] = E$_K$(M[i] ⊕ $\Delta$) ⊕ $\Delta$
$\Delta$ = 2 • $\Delta$
Pad = E$_K$(len(M[m]) ⊕ $\Delta$)
C[m] = Pad ⊕ M[m]    // |C[m]|=|M[m]|; use Pad bits 1 . . |M[m]|
C = C[1] • • • C[m]    // Ciphertext core
Checksum = M[1] ⊕ • • • ⊕ M[m−1] ⊕ C[m]0* ⊕ Pad
$\Delta$ = 3 • $\Delta$
FullTag = E$_K$ (Checksum ⊕ $\Delta$)
Auth = F$_K$ (AD)    // A pseudorandom function like PMAC
Tag = (FullTag ⊕ Auth) [first t bits]

TABLE 3-continued return C || Tag    // The final ciphertext, C
OCB2-Decrypt$_K$ (Nonce, AD, C)
Partition C into C[1] • • • C[m] Tag
$\Delta$ = E$_K$(Nonce)
for i=1 to m−1 do
    $\Delta$ = 2 • $\Delta$
    M[i] = E$_K^{-1}$(C[i] ⊕ $\Delta$) ⊕ $\Delta$
$\Delta$ = 2 • $\Delta$
Pad = E$_K$(len(M[m]) ⊕ $\Delta$)
M[m] = Pad ⊕ C[m]    // |M[m]|=|C[m]|; use Pad bits 1 . . |C[m]|
M = M[1] • • • M[m]
Checksum = M[1] ⊕ • • • ⊕ M[m−1] ⊕ C[m]0* ⊕ Pad
$\Delta$ = 3 • $\Delta$
FullTag = E$_K$ (Checksum ⊕ $\Delta$)
Auth = F$_K$ (AD)    // A pseudorandom function like PMAC
Tag' = (FullTag ⊕ Auth) [first t bits]
if Tag=Tag' then return M else return invalid Execution Vehicles The encryption and the decryption process used by the present invention may reside, without restriction, in software, firmware, or in hardware. The execution vehicle might be a computer CPU, such as those manufactured by Intel Corporation and used within personal computers. Alternatively, the process may be performed within dedicated hardware, as would typically be found in a cell phone or a wireless LAN communications card or the hardware associated to the Access Point in a wireless LAN. The process might be embedded in the special-purpose hardware of a high-performance encryption engine. The process may be performed by a PDA (personal digital assistant), such as a Palm Pilot®. In general, any engine capable of performing a complex sequence of instructions and needing to provide a privacy and authenticity service is an appropriate execution vehicle for the invention.

The various processing routines that comprise the present invention may reside on the same host machine or on different host machines interconnected over a network (e.g., the Internet, an intranet, a wide area network (WAN), or local area network (LAN)). Thus, for example, the encryption of a message may be performed on one machine, with the associated decryption performed on another machine, the two communicating over a wired or wireless LAN. In such a case, a machine running the present invention would have appropriate networking hardware to establish a connection to another machine in a conventional manner. Though we speak of a Sender and a Receiver performing encryption and decryption, respectively, in some settings (such as file encryption) the Sender and Receiver are a single entity, at different points in time.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for authenticated-encryption that encrypts a plaintext into a ciphertext without padding the plaintext, the method comprising:
    partitioning the plaintext into a first plaintext portion having a multiple of n bits and a second plaintext portion having n−1 or fewer bits;
    using a nonce to generate a sequence of offsets;

computing a first ciphertext portion having the same length as the first plaintext portion from the first plaintext portion, the sequence of offsets, and an n-bit block cipher;

computing a second ciphertext portion having the same length as the second plaintext portion from the second plaintext portion, an offset from the sequence of offsets, and the n-bit block cipher;

computing an n-bit authentication tag by using the n-bit block cipher to encipher a value that depends on the plaintext and an offset from the sequence of offsets; and defining the ciphertext as the first ciphertext portion, the second ciphertext portion, and a portion of the n-bit authentication tag.

2. The method of claim 1 wherein the n-bit authentication tag further depends on a string of non-confidential associated data.

3. The method of claim 1 wherein the nonce is a counter that gets incremented with every message encrypted.

4. The method of claim 1 wherein each non-initial offset from the sequence of offsets is determined by xor-ing the prior offset with one of a plurality of key-dependent values.

5. A non-transitory computer-readable storage medium storing instructions that, when executed by a computer, cause the computer to perform a method for authenticated-encryption that encrypts a plaintext into a ciphertext without padding the plaintext, the method comprising:

partitioning the plaintext into a first plaintext portion having a multiple of n bits and a second plaintext portion having n−1 or fewer bits;

using a nonce to generate a sequence of offsets;

computing a first ciphertext portion having the same length as the first plaintext portion from the first plaintext portion, the sequence of offsets, and an n-bit block cipher;

computing a second ciphertext portion having the same length as the second plaintext portion from the second plaintext portion, an offset from the sequence of offsets, and the n-bit block cipher;

computing an n-bit authentication tag by using the n-bit block cipher to encipher a value that depends on the plaintext and an offset from the sequence of offsets; and defining the ciphertext as the first ciphertext portion, the second ciphertext portion, and a portion of the n-bit authentication tag.

6. The non-transitory computer-readable storage medium of claim 5, wherein the n-bit authentication tag further depends on a string of non-confidential associated data.

7. The non-transitory computer-readable storage medium of claim 5, wherein the nonce is a counter that gets incremented with every message encrypted.

8. The non-transitory computer-readable storage medium of claim 5, wherein each non-initial offset from the sequence of offsets is determined by xor-ing the prior offset with one of a plurality of key-dependent values.

9. A circuit to perform authenticated-encryption that encrypts a plaintext into a ciphertext without padding the plaintext, the circuit comprising:

circuitry to partition the plaintext into a first plaintext portion having a multiple of n bits and a second plaintext portion having n−1 or fewer bits;

circuitry to use a nonce to generate a sequence of offsets;

circuitry to compute a first ciphertext portion having the same length as the first plaintext portion from the first plaintext portion, the sequence of offsets, and an n-bit block cipher;

circuitry to compute a second ciphertext portion having the same length as the second plaintext portion from the second plaintext portion, an offset from the sequence of offsets, and the n-bit block cipher;

circuitry compute an n-bit authentication tag by using the n-bit block cipher to encipher a value that depends on the plaintext and an offset from the sequence of offsets; and circuitry to define the ciphertext as the first ciphertext portion, the second ciphertext portion, and a portion of the n-bit authentication tag.

10. The circuit of claim 9, wherein the n-bit authentication tag further depends on a string of non-confidential associated data.

11. The circuit of claim 9, wherein the nonce is a counter that gets incremented with every message encrypted.

12. The circuit of claim 9, wherein each non-initial offset from the sequence of offsets is determined by xor-ing the prior offset with one of a plurality of key-dependent values.

13. The circuit of claim 9, wherein the circuit is an application-specific integrated circuit (ASIC).

14. The circuit of claim 9, wherein the circuit is a field-programmable gate array (FPGA).

* * * * *